(12) United States Patent
Ohkawa

(10) Patent No.: US 7,445,370 B2
(45) Date of Patent: Nov. 4, 2008

(54) SURFACE LIGHT SOURCE DEVICE, ILLUMINATION UNIT AND LIGHT FLUX CONTROL MEMBER

(75) Inventor: Shingo Ohkawa, Misato (JP)

(73) Assignee: Enplas Corporation, Kawaguchi (JP)

( * ) Notice: Subject to any disclaimer, the term of this patent is extended or adjusted under 35 U.S.C. 154(b) by 2 days.

(21) Appl. No.: 11/182,847

(22) Filed: Jul. 18, 2005

(65) Prior Publication Data

US 2006/0012993 A1     Jan. 19, 2006

(30) Foreign Application Priority Data

Jul. 16, 2004    (JP)   ............................ 2004-210673

(51) Int. Cl.
*F21V 7/04* (2006.01)
(52) U.S. Cl. ...................................... 362/617; 362/624
(58) Field of Classification Search ................. 362/608, 362/612, 613, 617, 622, 624, 330
See application file for complete search history.

(56) References Cited

U.S. PATENT DOCUMENTS

| | | | |
|---|---|---|---|
| 5,631,750 A | 5/1997 | Minoura et al. | 349/110 |
| 6,212,012 B1 | 4/2001 | Tanaka | 359/624 |
| 7,101,070 B2 * | 9/2006 | Yu et al. | 362/558 |

FOREIGN PATENT DOCUMENTS

| | | |
|---|---|---|
| DE | 196 21 148 A1 | 12/1997 |
| JP | 59-226381 | 12/1984 |
| JP | 63-6702 | 1/1988 |
| JP | 6-349305 | 12/1994 |
| JP | 10-293202 | 11/1998 |
| JP | 11-38203 | 12/1999 |
| JP | 2002-49326 | 2/2002 |
| WO | 03/016963 | 2/2003 |

OTHER PUBLICATIONS

European Search Report, Application No. 05 25 4407, mailed Oct. 26, 2005.

* cited by examiner

*Primary Examiner*—John A Ward
(74) *Attorney, Agent, or Firm*—Staas & Halsey LLP

(57) ABSTRACT

At least one LED emits light received by a light flux control member and subsequently emitted from an emission race thereof. Each LED is in a recess formed in the light flux control member and configured to satisfy the following conditions, for at least light emitted toward within a half-intensity-angular-range from the corresponding LED, where $\theta 1$ is the emission angle of any light emitted from the emission face of the light flux control member: (1) $\theta 5/\theta 1 > 1$, except for light emitted toward within an angular-neighborhood of a normal direction with respect to the emission face; and (2) $\theta 5/\theta 1$ decreases gradually as $\theta 1$ increases. If a plurality of LED's are employed, differences in emitting color among individual LED's are made less conspicuous and uniform illumination free from uneven brightness is realizable.

10 Claims, 20 Drawing Sheets

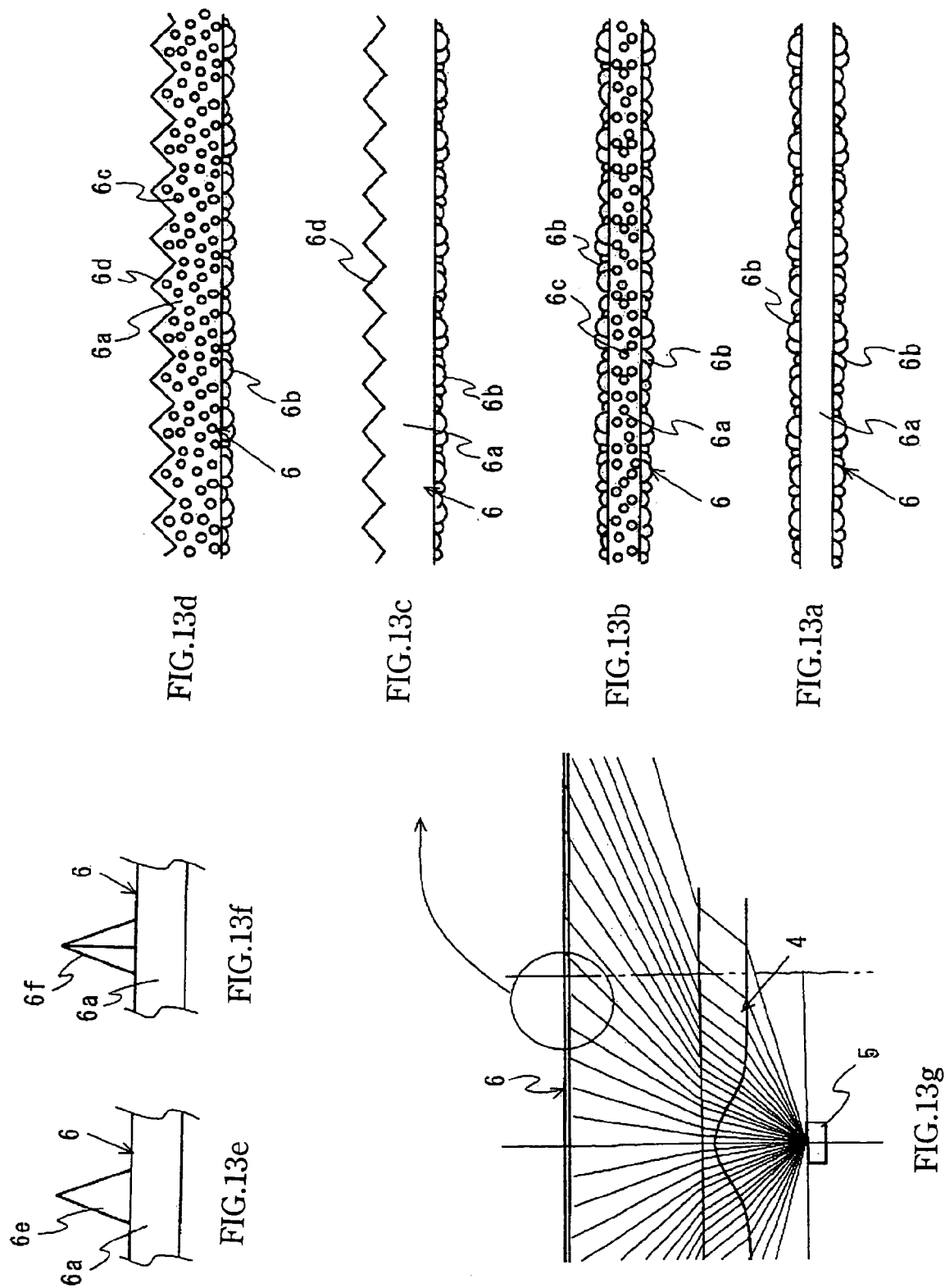

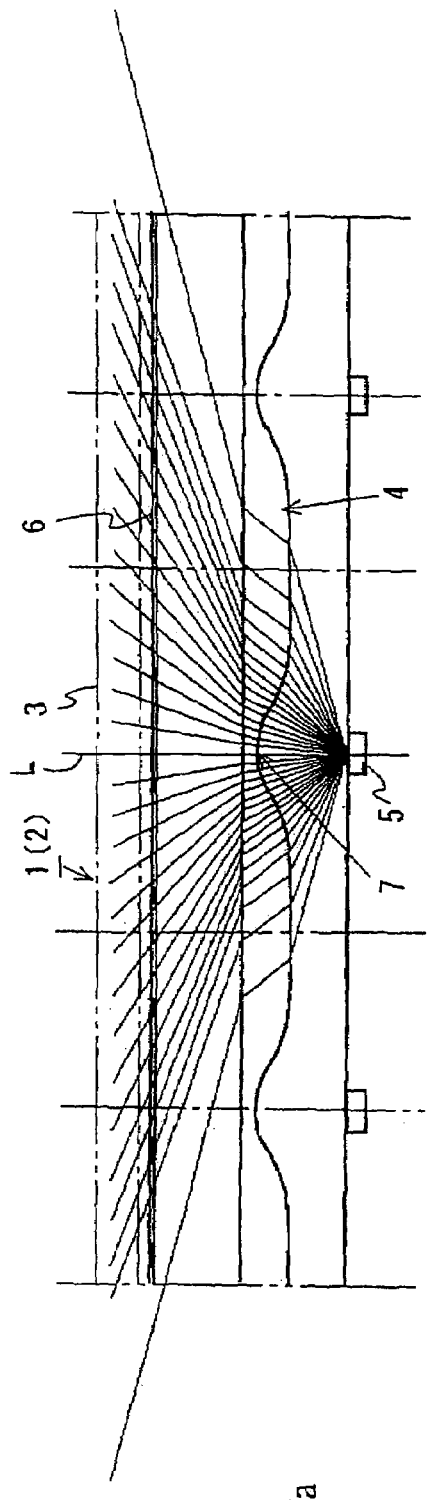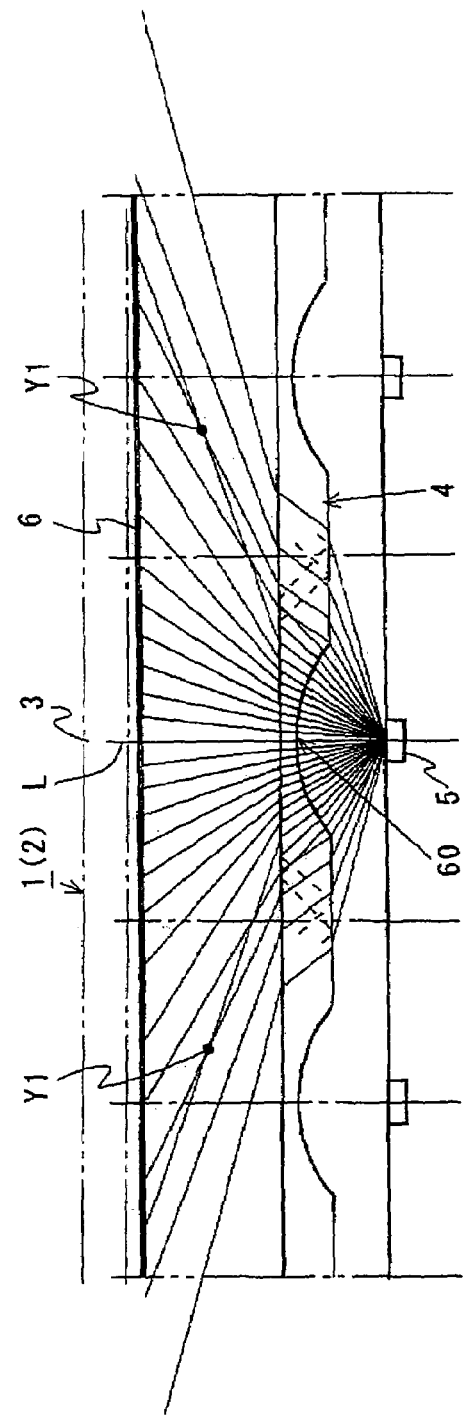
FIG.17a
FIG.17b (PRIOR ART)

SURFACE LIGHT SOURCE DEVICE, ILLUMINATION UNIT AND LIGHT FLUX CONTROL MEMBER

BACKGROUND

1. Field of the Invention

The present invention relates to a surface light source device, illumination unit and light flux control member, being applied, for instance, to a surface light source device for backlighting a liquid crystal display panel, an illumination unit adopting the surface light source device as an illuminating means, or a light flux control member employed in those. More specifically, surface light source devices, illumination units and light flux control members in accordance with the present invention are able to be applied to backlighting arrangements for TV's or personal's computer monitor displays.

2. Related Art

A surface light source device employing a plurality of LEDs (light emitting diodes) as point-like light sources has been known as an illuminating means for a LCD monitor display of a personal computer or TV set. A plate-like light flux control member having roughly the same shape as that of a LCD panel is employed in the surface light source device, being provided with a plurality of LEDs arranged like a matrix at the back side. The LEDs emit light which is incident to a back face of the light flux control member and travels within the light flux control member to an emission face opposite to the back face, being outputted from the emission face toward a LCD panel to be backlighted. Prior arts like this have been disclosed in the following documents.

<Prior Art 1>

This is found disclosed in Tokkai 2002-49326 (JP-A) 2002-49326), according to which surface light source device 10 is provided with microlens array 102. Individual microlenses are arranged in one-to-one correspondence to a plurality of LEDs 101, as shown in FIG. 22. Light from LEDs 101 is outputted in a direction perpendicular to a plane (upward) via microlens array 102.

<Prior Art 2>

This is found disclosed in Tokkaisho 59-226381(JP-A 1984-226381), according to which emission display device 103 is provided with LED 104, concave lens 105 and convex lens 106, as shown in FIG. 23. Light from LED 104 is condensed by convex lens 106 after being diverged by concave lens 105, being outputted in a direction roughly parallel with an "optical axis" of LED 104. Please note that "optical axis" is defined as a light travelling direction at a center of three-dimensional light flux emitted from a point-like light source (LED 104).

<Prior Art 3>

This is found disclosed in Tokkaisho 63-6702 (JP-A 1988-6702), providing an illumination unit 107 having LED(s) 108, as shown in FIG. 24. Light from LED 108 is condensed by condenser lens 110 and directed forward, then being diverged by diverging lens 111.

<Prior Art 4>

Another prior art provides illumination unit 1 as shown in FIG. 17b.

Illumination unit 1 is provided with light flux control member 4 and LED 5 which is arranged at the side of back face 4a of light flux control member 4. Back face 4a has a semi-spherical recess 60 facing to LED 5 so that light from LED 5 enters into light flux control member 4 via recess 60. The light is outputted from emission face 4b.

However, the above prior arts involve problems as follows.

(1) Prior Art 1;

Surface light source device 100 has a portion at which configuration of microlens array 102 varies discontinuously. The portion is located between LEDs 101 adjacent to each other. Emission intensity changes sharply at this discontinuity portion, with the result that a conspicuous unevenness in brightness appears around boundary regions between individual microlenses of microlens array 102.

(2) Prior Art 2;

It is difficult to say that concave lenses 105 in emission display 103 are coupled with each other continuously to form a plane. Further to this, convex lenses 106 are scarcely coupled with each other continuously to form a plane. Therefore, a member of a large area to be illuminated, such as large-screen liquid crystal display panel, is hardly supplied with uniform illumination light.

(3) Prior Art 3;

With illumination unit 107, light from LED 108 is diverged by diverging lens 111 after being condensed by condenser lens 110. This will reduce unevenness in brightness as compared with Prior Art 1. However, a sufficient mixing of light fluxes from LEDs 108 adjacent to each other is hardly expected, with the result that unevenness in emission color between individual LEDs 108 tends to be conspicuous.

(4) Prior Art 4;

With illumination unit 1, emission angle θ1 at emission from LED 5 and emission angle θ5 at emission from light flux control member 4 satisfy a relation θ5/θ1>1 for light from LED 5 other than light within an angular neighbourhood of a normal direction as illustrated in FIGS. 17b and 4. Please note that "normal direction" is defined as a direction which accords with optical axis L in FIG. 17b and a normal perpendicular to emission face 4b of light flux control member 4. In other words, emission angel θ1 at emission from LED 2 is greater than emission angel θ5 at emission from light flux control member 4. This enables emission fluxes from LED 5 to be converted into expanded emission fluxes.

However, an incidence to an end edge of a recess 60 brings light that intersects with light brought by incidence to a neighbourhood of the end edge because the end edge of recess 60 (connecting portion between semi-sphere-like recess 60 and generally flat back face 4a) gives a sharp edge. This intersection of light raises a problem of ring-like emission. As a result, illumination unit 1 fails to expand light from LED 5 smoothly and effectively to a desirable range.

OBJECT AND SUMMARY OF INVENTION

An object of the present invention is to avoid a surface light source device employing a plurality of point-like light sources such as LEDs, and illumination unit using the surface light source device from showing a conspicuous unevenness of emission color and from showing an irregular brightness.

Another object of the present invention is to enable a surface light source device employing a single point-like light source such as LED and illumination unit including the surface light source device to expand light from the point-like light source smoothly and effectively to a desirable range.

The present invention is basically featured by employment of a novel light flux control member that receives light from a single or plurality of point-like light sources and have the light be outputted from an emission face.

This light flux control member is provided with a recess corresponding to a point-like light source. If a plurality of point-like light sources are employed, a plurality of recesses are formed so that each of them corresponds to each of the point-like light sources.

Each recess is configured so as to satisfy the following Conditions 1 and 2 for at least light which is emitted toward within a half-intensity-angular-range from said point-like light source.

Condition 1: Relation $\theta5/\theta1>1$ is satisfied except for light emitted toward within an angular-neighborhood of a normal direction with respect to said emission face;

Condition 2; Value of $\theta5/\theta1$ falls gradually according to increasing of $\theta1$;

(where $\theta1$ is an emission angle of any light at being emitted from said point-like light source and $\theta5$ is an emission angle of that light at being then emitted from said emission face).

It is noted that "emission angle" is expressed by angle of emission direction with respect to a normal direction of an emission face of a light flux control member.

Each recess may have a first light-input face and a second light-input face which are connected at a connection location to provide a point of inflection.

The present invention provides the above light flux control member, further providing a surface light source device employing the light flux control member and one or more point-like light sources in combination, and an illumination unit employing the surface light source device and a light diffusion member.

The surface light source device in accordance with the present invention comprises the above light flux control member and one or more point-like light sources, being constructed as to the light from the point-like light source(s) is outputted through the light flux control member.

The illumination unit in accordance with the present invention comprises the above surface light source device and light diffusion member, being constructed as to the light from the surface light source device is outputted through the light diffusion member.

According to the present invention, light fluxes from a point-like light source are expanded smoothly and effectively to a wide range by a recess corresponding to the same LED. As a result, an illumination light having a uniform brightness is emitted from an emission face of a light flux control member over wide range.

If a plurality of point-like light sources are employed, light fluxes from them tend to be mixed easily. Therefore, if differences in emission color exist, emission obtained though the light flux control member not only tends to be free from the differences but also shows a high uniformity in brightness.

BRIEF DESCRIPTION OF DRAWINGS

FIGS. 13a, 13b, 13c, 13d, 13e and 13f are side views of light diffusion members in accordance with to first, second, third, forth, fifth and sixth examples, respectively, and FIG. 13g is an enlarged partial view of illumination unit in which light diffusion members shown FIGS. 13a to 13f are to be employed;

FIGS. 14a and 14b illustrate a first modification of surface light source device and illumination unit to which the present invention is applicable, wherein FIG. 14a is a plan view in which a member to be illuminated and light diffusion member is not shown and FIG. 14b is a cross section view along X2-X2 in FIG. 14a;

FIGS. 15a and 15b illustrate a second modification of surface light source device and illumination unit to which the present invention is applicable, wherein FIG. 15a is a plan view in which a member to be illuminated and light diffusion member is not shown and FIG. 15b is a cross section view along X3-X3 in FIG. 14a;

FIG. 17a illustrates an illumination unit (single light source) employing a light flux control member provided with a recess configurated in accordance with the present invention and FIG. 17b illustrates an illumination unit (single light source) employing a light flux control member provided with a recess configurated in accordance with a prior art (forth prior art), for comparison;

FIGS. 21a and 21b illustrate other modifications of light flux control members in accordance with the present invention, wherein FIG. 21a is a partial cross section view of an illumination unit in which recesses are formed on an emission face and FIG. 21b is a partial cross section view of an illumination unit in which recesses are formed on both an emission face and back face;

EMBODIMENT

<Outlined Structure of Surface Light Source Device and Illumination Unit>

Figure 1:
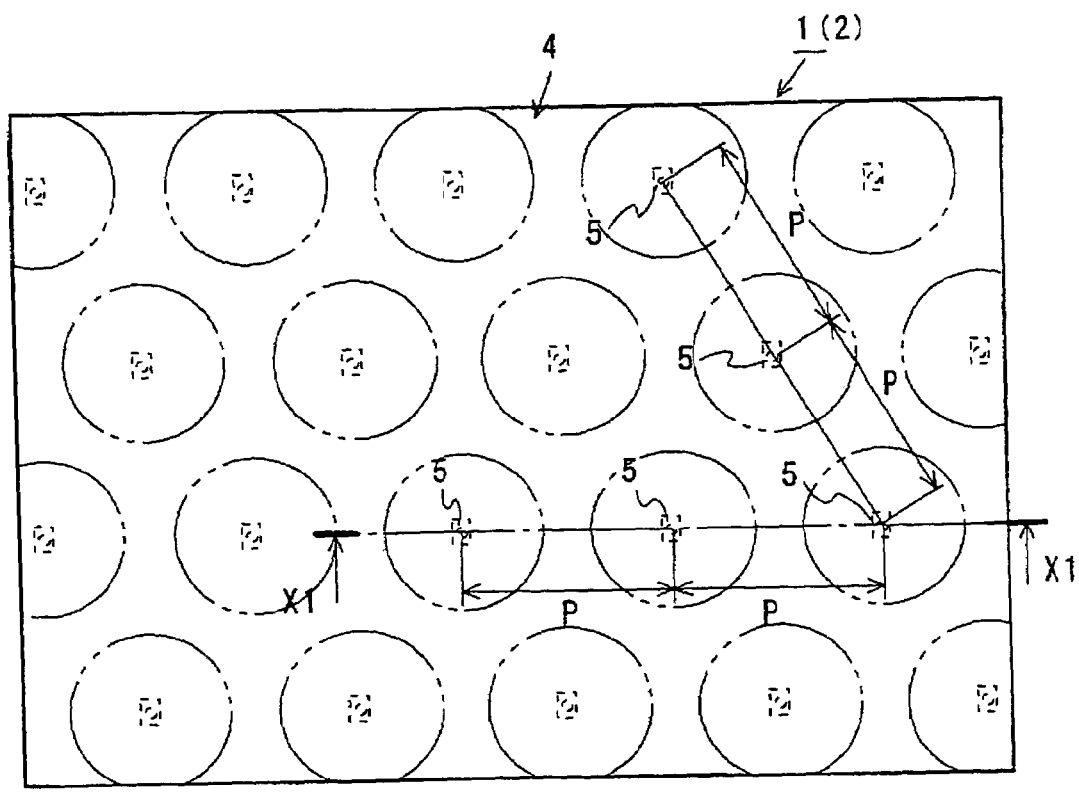
FIG. 1 is a plan view illustrating a surface light source device and illumination unit to which the present invention is applicable, with a member to be illuminated and light diffusion member being not shown.
Figure 2:
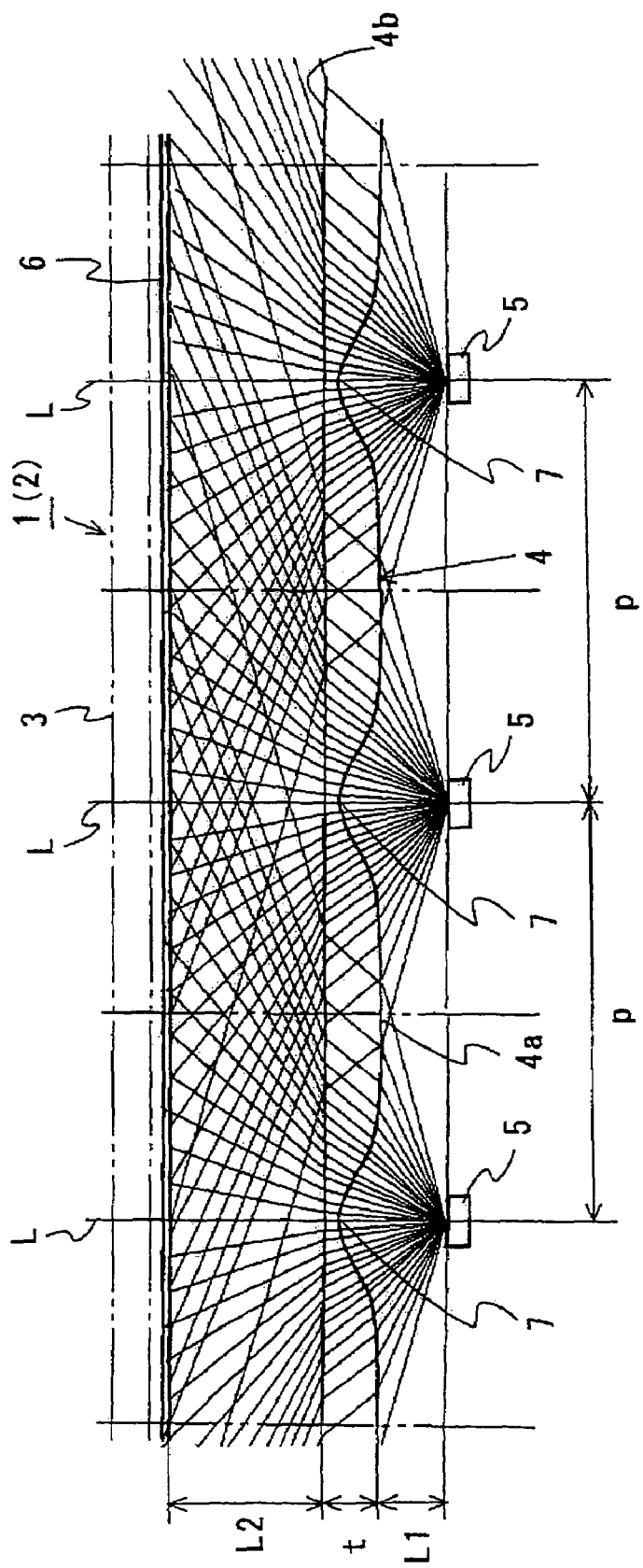
FIG. 2 is a cross section view of the illumination unit shown in FIG. 1 along X1-X1.
Figure 3:
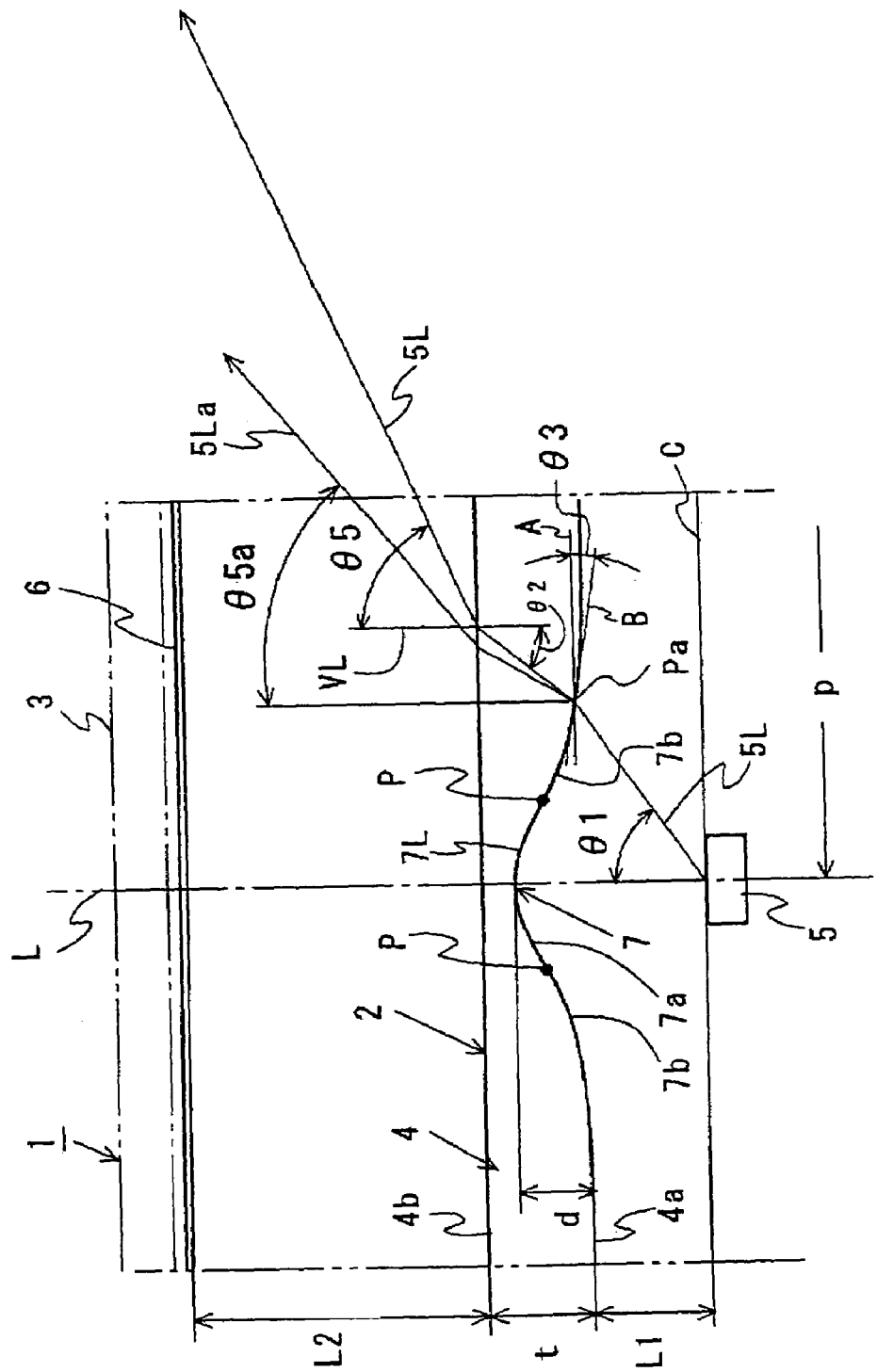
FIG. 3 is a partial cross section view of the illumination unit along a plane on which an optical axis of a LED extends, giving a partial and enlarged illustration of FIG. 2 in order to illustrate details of a recess configuration.

FIGS. 1 to 3 show an illumination unit 1 and surface light source device 2 included in the illumination unit 1 which are employed in this embodiment. FIG. 1 is a plan view illustrating a surface light source device 2 and illumination unit 1, with a member such as LCD panel 3 to be illuminated being not shown. FIG. 2 is a cross section view of the illumination unit shown in FIG. 1 along X1-X1. FIG. 3 is a partial cross section view of the illumination unit 1 along a plane on which optical axis L of LED 5 extends, giving a partial and enlarged illustration of FIG. 2 in order to illustrate details of a configuration of recess 7.

Referring to FIGS. 1 to 3, illumination unit 1 comprises light flux control member 4, a plurality of point-like light sources 5 arranged at a generally constant intervals on the side of back face 4a of light flux control member 1, light diffusion member 6 and a member 3 to be illuminated. Members 3 and 6 are disposed separately from emission face 4b, providing a gap between members 3, 6 and emission face 4b. Light flux control member 4 has a shape like a rectangular plate. In this embodiment, point-like light sources 5 are LEDs (light emitting diodes). Surface light source device 2 is composed of light flux control member 4 and LEDs 5.

<Light Flux Control Member>

(First Mode)

Thin plate-like light flux control member 4 is made of transparent resin such as PMMA (polymethyl methacrylate) or PC (polycarbonate), or transparent glass, having emission face 4b and back face 4a. Back face 4a is provided with recesses 7 each of which faces each LED 5 correspondingly. Each recess 7 consists of first light inputting face 7a, which is spherical, and a second light inputting face 7b connecting an periphery edge of recess 7 with an are of back face 4 around recess 7.

Light inputting face 7a provides a concave surface extending symmetrically with respect to optical axis L of LED 5. Second light inputting face 7b provides a convex surface curved in an opposite direction as compared with first light inputting face 7a. Accordingly, recess 7 has a point of inflection P at a portion connecting first and second light inputting faces 7a and 7b. It is noted that a direction giving the maximum emission intensity from LED 5 accords with optical axis L.

In FIG. 3, reference plane C is defined a horizontal plane perpendicular to optical axis L of LED 5. Line A is defined as a line extends parallel with reference plane C as to pass position Pa at which light beam 5L emitted from LED 5 is incident to light flux control member 4. It is noted that light beam 5L generally represents emission from LED 5.

It is also noted that incidence position Pa gives a point of intersection of cross section configuration line 7L of recess 7 shown in FIG. 3 and light beam 5L. In addition, line B is a tangent of configuration line 7L of recess 7 at incidence position Pa. Tangent B and line A make angle θ3 which may be called "lens inclination angle".

Light beam 5L travelling within light flux control member 4 makes an incidence angle (inner incidence angle) θ2 on impinging upon emission face 4b. Angle θ2 is an angle which light beam 5L makes with respect to normal VL of emission face 4b just before being outputted from light flux control member 4. Finally, angle θ5 is an emission angle from emission face 4b which light beam 5L makes with respect to normal VL of emission face 4b after being outputted from light flux control member 4.

An angular range called "half-intensity-angular-range" is introduced for LED 5 in order to describe optical conditions to be satisfied by recess 7.

As mentioned previously, LED 5 has the maximum emission intensity direction according with optical axis L. The maximum emission intensity direction is also a direction along a normal of emission face 4b of light flux control member 4. Emission intensity of LED 5 falls gradually according to an increasing angular deviation from the maximum emission intensity direction, in other words, from the direction of optical axis L or the normal.

Under such situation, "half-intensity-angular-range" is defined as an angular range extending up to an intensity-falling of 50% as compared with the maximum emission intensity from the maximum emission intensity direction.

Recess 7 is configured so as to satisfy the following Conditions 1 and 2 for "light which is emitted toward within a certain angular range at least including half-intensity-angular-range from LED 5".

Condition 1: Relation θ5/θ1>1 is satisfied except for light emitted toward within an angular-neighborhood of a normal direction with respect to emission face 4B. It is noted that "angular-neighborhood of a normal direction" is preferably an angular range within 5 degrees (±5°) from the direction of optical axis L.

Condition 2; Value of θ5/θ1 falls gradually according to increasing of θ1.

Figure 4:
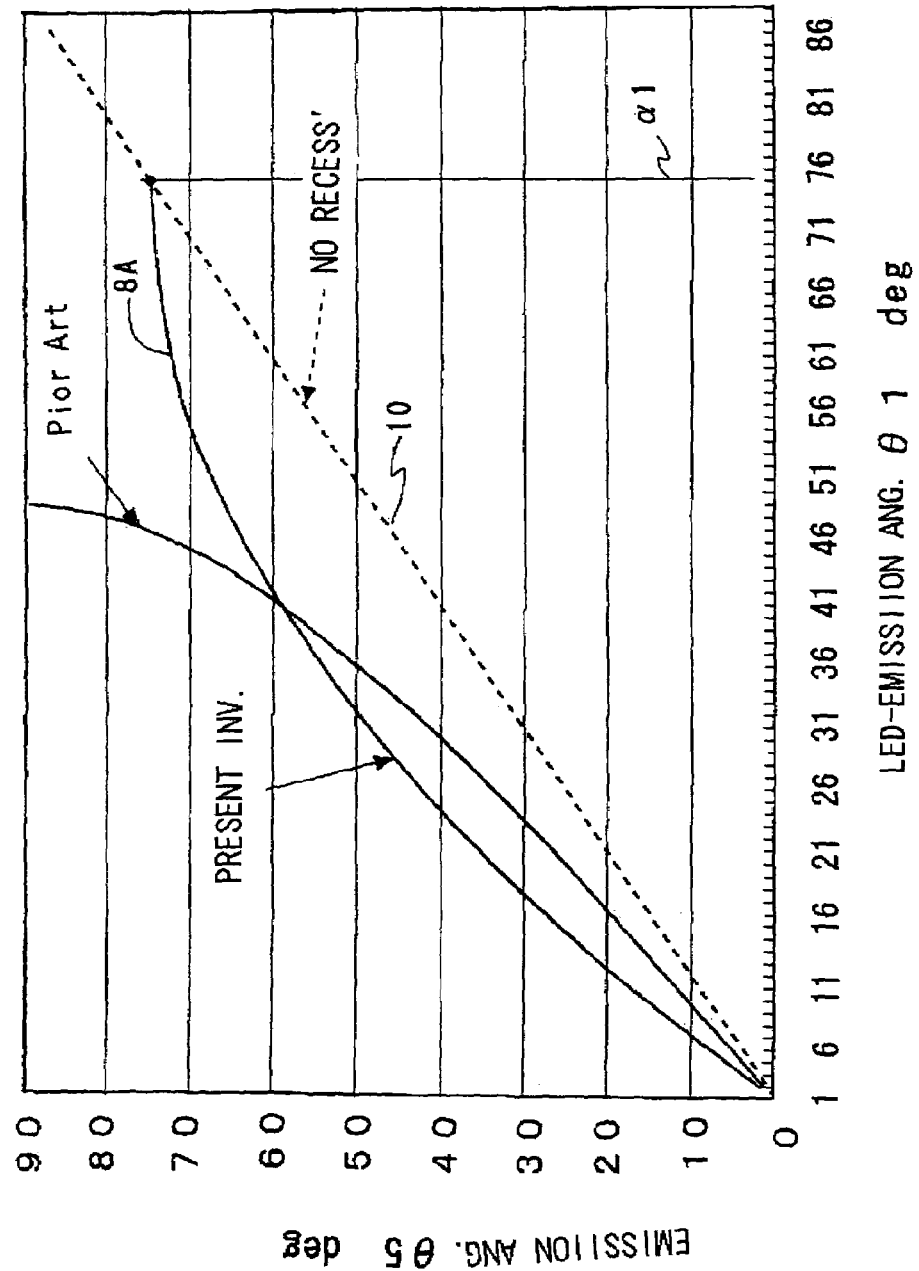
FIG. 4 is a diagram illustrating a relation between LED-emission angle $\theta1$ and emission angle $\theta5$ for a light flux control member.

FIG. 4 is a diagram illustrating a relation between LED-emission angle θ1 and emission angle θ5 for light flux control member 4. In FIG. 4, the above "certain angular range at least including half-intensity-angular-range" is exemplarily shown as a range of θ1 satisfying a relation θ1<α1.

Curve 8A in FIG. 4 shows an example of relation between θ1 and θ5 that satisfies the above Conditions 1 and 2. Dotted line 10 in FIG. 4 shows an equation (θ5/θ1)=1.

It is noted that angles θ2 and θ3 are expressed as the following Formulae 1 and 2, wherein n is refractive index of light flux control member 4.

θ2=sin−1(sin θ5/n)    Formula 1

θ3=tan−1[(sin θ1−n·sin θ2)/(cos θ1−n·cos θ2)]    Formula 2

Figure 5:
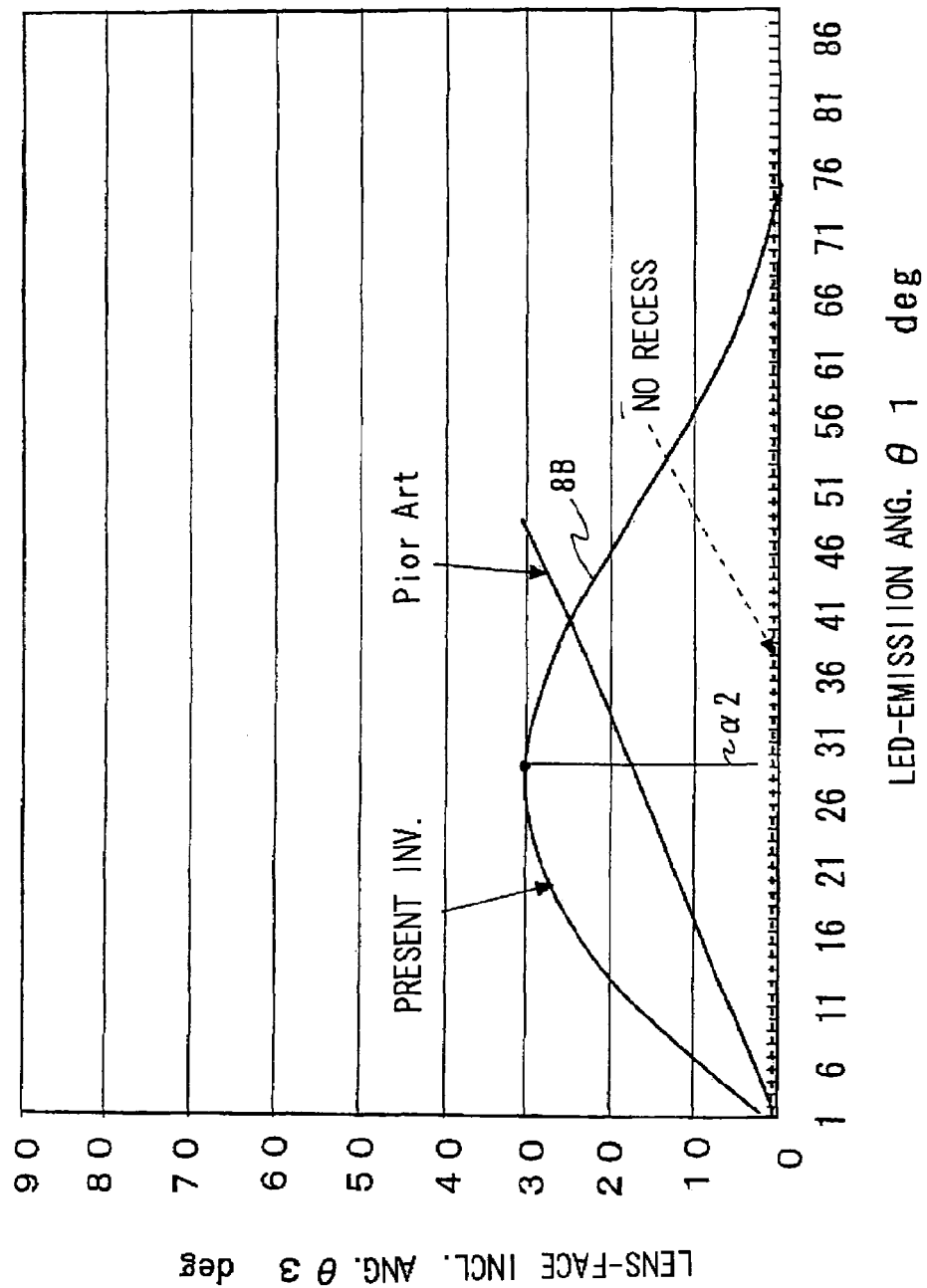
FIG. 5 is a diagram illustrating a relation between LED emission angle $\theta1$ and lens-face inclination angle $\theta3$ for the light flux control member.

Thus relation between θ3 and θ1 is shown by curve 8B in FIG. 5. Curve 8B tells that θ3 increases gradually according to increasing of θ1 until θ1=θ3=α2 is satisfied. It is noted that θ3 decreases gradually according to increasing of θ1 in a range θ1>α2.

General operations light flux control member 4 having recess 7 configurated as above are as follows.

As illustrated in FIG. 3, light beam 5L generally representing emission from LED 5 enters into light flux control member 4 through recess 7. Refraction occurring at recess 7 involves expansion of travelling directions of light fluxes represented by light beam 5L. Light fluxes having expanded travelling directions are emitted from emission face 4b of light flux control member 4 towards the ambient (air) according to Snell's Law.

Even though back face 4a is flat (without recess 7), refraction occurs at back face 4a too, but expansion of light travelling directions occurs little.

Therefore, if an imaginary incident light beam 5La is introduced under existence of such an imaginary flat face, emission angle of imaginary light beam 5La θ5a will satisfy θ5a<θ5. It is noted that θ5a is an angle made by imaginary light beam 5La with respect to a normal of emission face 4b.

As understood from the above explanation, the present invention enables much expanded light fluxes to be outputted as compared with cases where no recess 7 is formed.

As a result, some of light fluxes from "a LED 5" having LED emission angle θ1 within half-intensity-angular-range can come after being outputted from emission face 4b, for example, up to a position corresponding to an intersection point of light diffusion member 9 and optical axis L of a distant LED 5 beyond an adjacent LED 5 that is adjacent to the above "a LED 5" as shown in FIG. 2.

(Example of Light Flux Control Member in First Mode)

Figure 6:
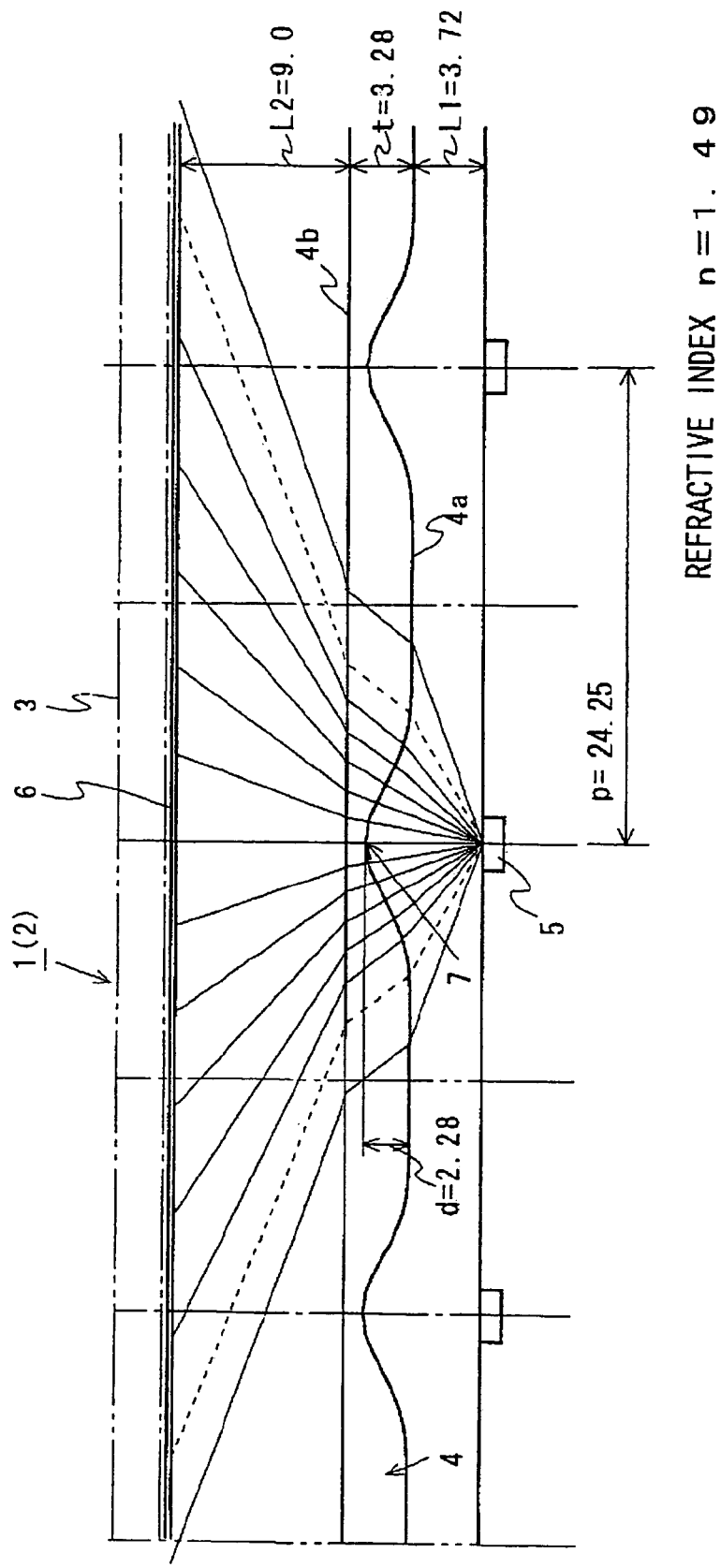
FIG. 6 is a cross section view of an illumination unit in accordance with a first embodiment.

In the next place, examples of light flux control member 4 are described by referring to FIGS. 4 to 6.

Recess 7 of light flux control member 4 has sizes, such as the maximum diameter and depth d, and shapes of first and second light inputting faces 7a, 7b, which are determined preferably depending on factors such as emission characteristics (including angular emission range; half-intensity-angular-range), distance L1 between LED 5 and light flux control member 4, arrangement pitch (interval) of LEDs 5 p, thickness of light flux control member t, and distance L2 between emission face 4b and light diffusion member 6. It is noted that the maximum diameter is outermost diameter of second light inputting face 7b.

Referring to FIG. 6 showing an example, light flux control member 4 is made of transparent resin material having refractive index n=1.49, and L1=3.72 mm, p=24.25 mm, t=3.28 mm, L2=9.0 mm and d=2.28 mm.

A periphery portion of second light inputting face 7b is smoothly coupled with a generally flat configuration of back face 4a at a position to which a light beam of θ1 approximately equal to 75° is incident.

This will be understood by referring to line 8B shown in FIG. 5. FIG. 5 illustrates a relation between LED emission angle θ1 and lens-face inclination angle θ3 in an illustration manner similar to FIG. 4.

First light inputting face 7a of recess 7 shown in FIG. 3 is formed, as illustrated by curve 8B in FIG. 5, corresponding to an angular range along a curving part in which θ3 increases according to increasing of θ1 (corresponding to a range in which θ1 is smaller than about 30°).

On the other hand, second light inputting face 7b of recess 7 is formed, as illustrated by curve 8B in FIG. 5, corresponding to another angular range along another curving part in which θ3 decreases according to increasing of θ1 (corresponding to a range in which θ1 changes from about 30° to 75°)

Curve 8B has a point of inflection roughly corresponding to a point of θ1=30° changing from "increasing" to "decreasing" at the point of inflection. It is noted that first and second light inputting faces 7a and 7b are connected to each other at the point of inflection.

In the illustrated example, recess 7 is configured so that θ3 is about 30° when θ1 is about 30°.

It is noted that "curving part" includes smooth curve and other similar lines, such as successively connected extremely short linear lines or an approximately curved line having a linear part, so far as they look like "curve" as a whole.

If recess 7 is formed as above, emission angle θ5 of emission from emission face 4b increases smoothly and gradually from 0° to about 75° as to depict an upward-convex curve 8A as shown in FIG. 4.

At about 75°, curve 8A accords with line 10 showing an imaginary relation between θ1 and θ5 under an imaginary condition without recess 7. Curve 8A is an upward-convex curve as a whole, being allowed to include a liner-line-like part.

(Other Modifications of First Mode)

FIGS. 7 to 10 ar4e plan views of first to forth modifications of light flux control member 4, respectively.

Figure 7:
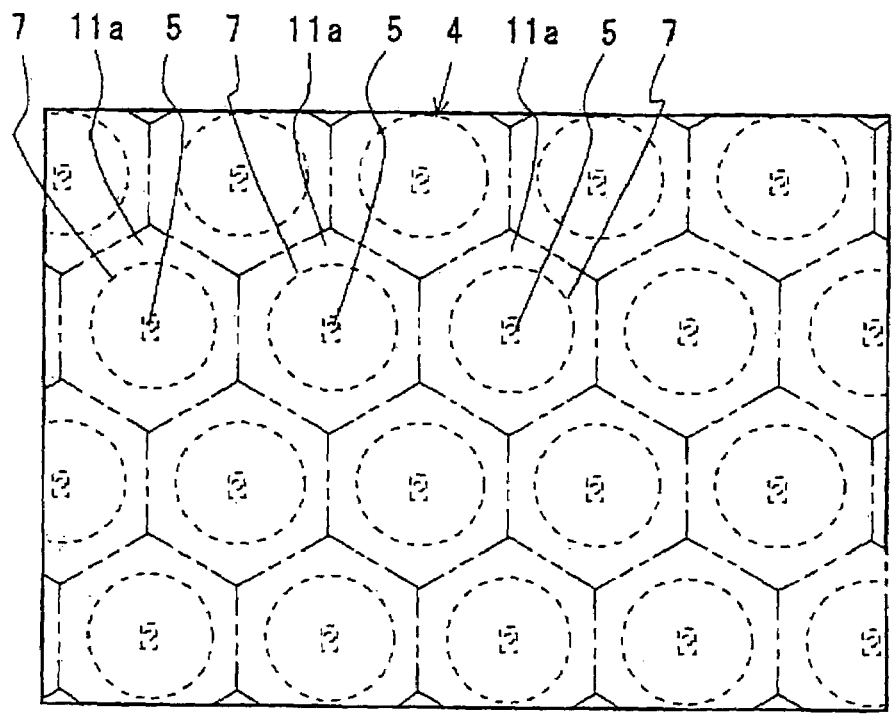
FIG. 7 is a plan view of a light flux control member in accordance with a first modification.

Light flux control member 4 shown in FIG. 7 is formed of a plate like member looking like one shown in FIG. 1 as a whole, which is composed of a plurality of light flux control member fragments 11a connected to each other. Each fragment 11a corresponds to each LED 5.

Figure 8:
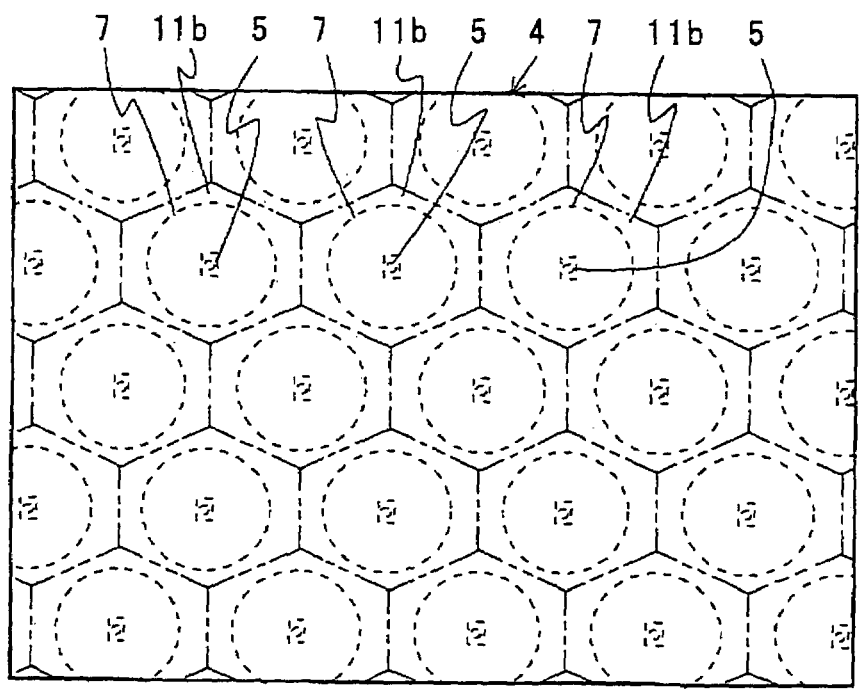
FIG. 8 is a plan view of a light flux control member in accordance with a second modification.
Figure 9:
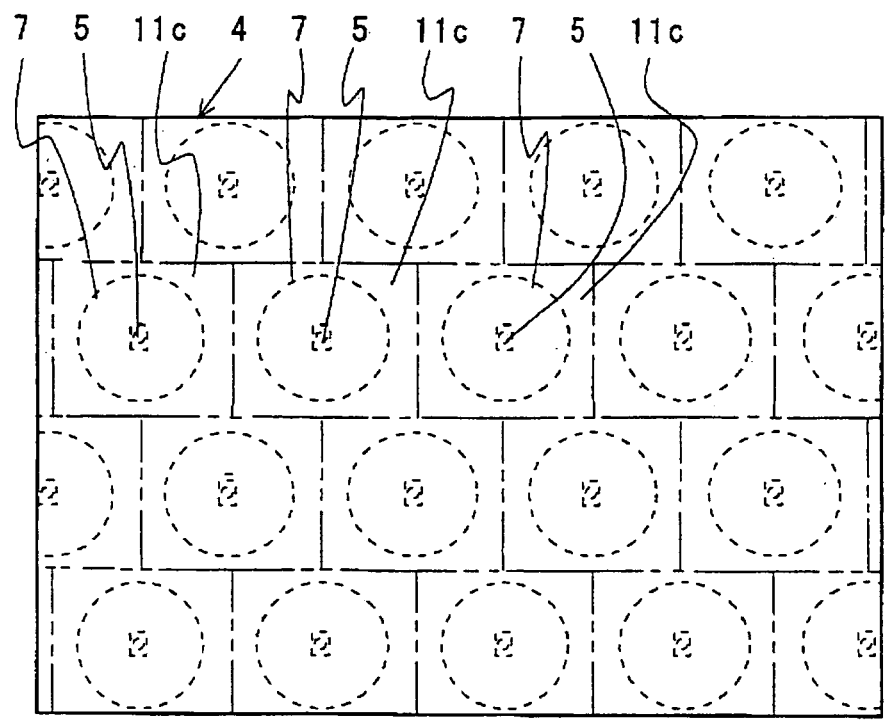
FIG. 9 is a plan view of a light flux control member in accordance with a third modification.
Figure 10:
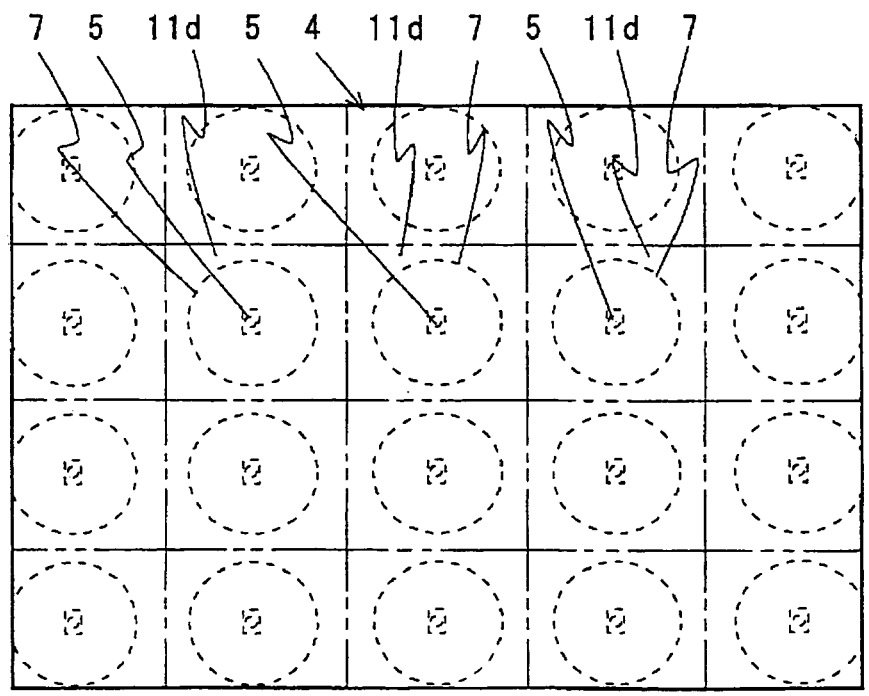
FIG. 10 is a plan view of a light flux control member in accordance with a forth modification.
Figure 11:
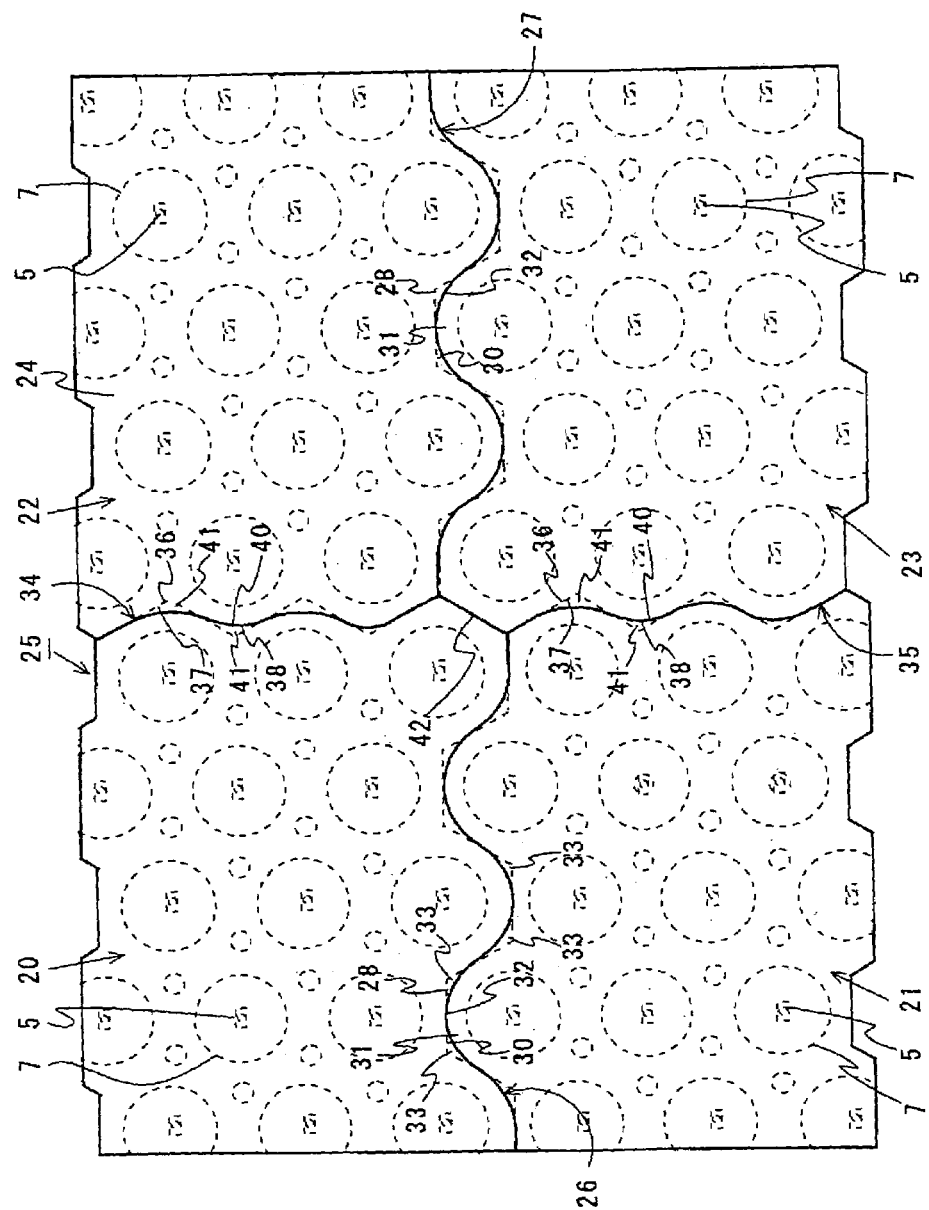
FIG. 11 is a plan view of a light flux control member assembly having a large emission face, which is produced by combining a plurality of light flux control members.
Figures 12A, 12B, 12C:
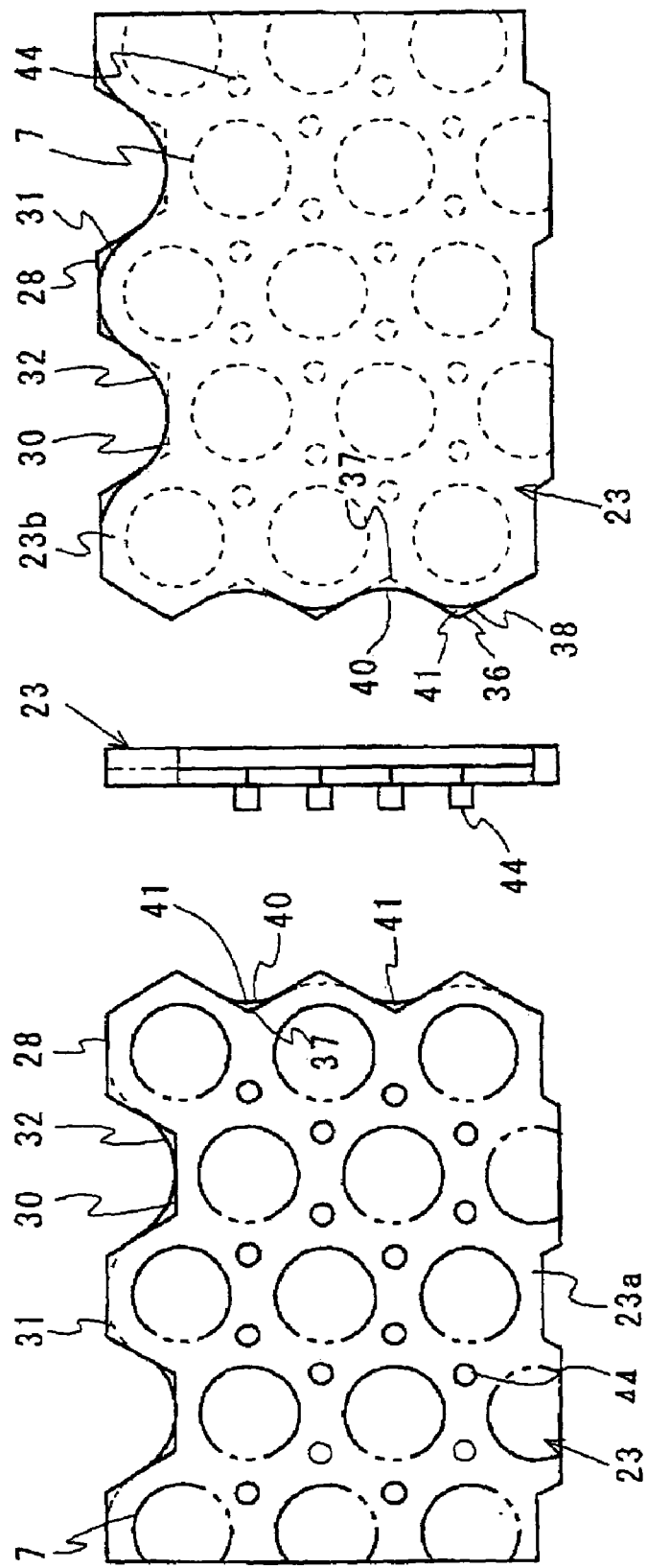
FIGS. 12a, 12b and 12c are a back plan view, side view and plan view of a light flux control member employed in a light flux control member assembly, respectively.

In similar ways, light flux control members 4 shown in FIGS. 8 to 10 are formed of plate like members looking like one shown in FIG. 1 as a whole, each of which is composed of a plurality of light flux control member fragments 11b (FIG. 8), 11c (FIG. 9) or 11d (FIG. 10) connected to each other. Each fragment 11a corresponds to each LED 5. Each fragment 11b, 11c or 11d corresponds to each LED 5.

As illustrated in FIG. 7, each fragment 11a is shaped like equilateral hexagon, being fixed with light permeable adhesives (such as UV-setting agent). Each fragment 11a has one recess 7 corresponding to each LED 5 on a back face opposite to an emission face of the instant light flux control member.

As illustrated in FIG. 8, each fragment 11b is shaped like slender hexagon, being fixed with light permeable adhesives (such as UV-setting agent). Each fragment 11b has one recess 7 corresponding to each LED 5 on a back face opposite to an emission face of the instant light flux control member.

As illustrated in FIG. 9, each fragment 11c is shaped like square, being fixed with light permeable adhesives (such as UV-setting agent). Fragments 11c are connected to each other so that fragments 11c in a row and ones in upper or lower adjacent row are shifted mutually by a pitch of half fragment size. Each fragment 11c has one recess 7 corresponding to each LED 5 on a back face opposite to an emission face of the instant light flux control member.

As illustrated in FIG. 10, each fragment 11d is also shaped like square, being fixed with light permeable adhesives (such as UV-setting agent) as to be aligned lengthwise and crosswise.

In first through forth modifications, each LED 5 is arranged generally corresponding to an area-center of each fragment shaped like hexagon or square. Each recess 7 is formed on a back face of fragment 11a, 11b 11c or 11d as to provide a concave configuration symmetric with respect to optical axis L o LED 5. It is noted that recess 7 may have a periphery edge shape other than circle-like shape (point-symmetric with respect to optical axis L), for instance, ellipse-like shape.

(Second Mode)

Referring to FIGS. 11 and 12a to 12c, light flux control member assembly 25 having a large emission face. Light flux control member assembly 25 is composed of first to forth light flux control members 20 to 23. Light flux control member assembly 25 is called simply "assembly 25". First and forth light flux control members 20 and 23 have the same shape and second and third light flux control members 21 and 22 have the same shape. Thus assembly 25 is composed of two kinds of light flux control members 20, 23 and 21, 22.

Engaging portion 26 of first and second light flux control members 20, 21 and engaging portion 27 of third and forth fcs 22, 23 are divided into two parts, upper face side part and lower face side part with a boundary at a middle position along thickness direction.

Projecting portion 28 shaped like trapezoid provided by three sides of hexagon formed in the lower face side part is engaged with recessing portion 30. Similarly, arc-like projecting portion 31 formed in the upper face side part is engaged with recessing portion 32.

As illustrated in FIGS. 11 and 12a to 12c, top portions of trapezoid-like projecting portion 28 and arc-like projecting portion 31 roughly correspond to each other while bottom portions of trapezoid-like recessing portion 30 and arc-like recessing portion 32 roughly correspond to each other.

A set of light flux control members 20, 21 engaged with each other and another set of light flux control members 22, 23 engaged with each other are supported by triangle-like corner fillet portions 33 from the lower side at engaging portions 26, 27, respectively. Corner fillet portions 33 are provided by corners of bottom portion of arc-like recessing portion 32 and trapezoid-like recessing portion 30.

Such structure prevents first and second light flux control members 20, 21 and third and forth light flux control members 22, 23 to slide along a thickness direction of light flux control members 20 to 23.

Engaging portion 34 of first and third light flux control members 20, 22 and engaging portion 35 of second and forth light flux control members 21, 23 are divided into two parts, upper face side part and lower face side part with a boundary at a middle position along thickness direction.

Projecting portion 36 shaped like triangle provided by two sides of hexagon formed in the lower face side part is engaged with recessing portion 37. Similarly, arc-like projecting portion 38 formed in the upper face side part is engaged with recessing portion 40.

Further, as illustrated, top portions of arc-like projecting portion 38 and triangle-like projecting portion 36 provide corner fillet portion 41 with which triangle-like projection portions 36 of light flux control members 20, 21, 22 or 23 to be engaged with as to be supported from the lower side.

Such structure prevents first and third 20, 22 and second and forth light flux control members 21, 23 to slide along a thickness direction of light flux control members 20 to 23.

An oblique side 42 of hexagon buts against first and forth light flux control members 20, 23 roughly at a center position of light flux control member assembly 25.

At the back face side of light flux control members 20 to 23 (for example, at the side of back face 23a kn FIG. 12a, 12b) on which recesses are formed, supporting projections 44 for supporting light flux control members 20 to 23 are arranged around recesses 7, respectively, as to abut against substrate not shown.

Each of engaging portions 26, 27, 34 and 35 is fixed by light permeable adhesives such as UV-setting agent. Alternatively, a member such as frame member may be employed for holding the light flux control members.

Light flux control assembly 25 constructed as above enables a backlighting arrangement (surface light source device) for large screen monitor display to be manufactured. It should be noted that assembly 25 may be composed of other numbers of fcs, for instance, two, three, five or more.

<Light Diffusion Member>

FIGS. 13a, 13b, 13c, 13d, 13e and 13f are side views of light diffusion members 6 in accordance with to first, second, third, forth, fifth and sixth examples, respectively. Any of illustrated light diffusion members 6 can be arrange at the emission face side of light flux control member 4.

Each light diffusion member 6 is a sheet-like or plate-like member made of light well-permeable resin such as PMMA (polymethyl methacrylate) or PC (polycarbonate), having an area size generally equal to that of member 3 to be illuminated such as LCD panel, advertising display panel.

Light diffusion member 6 shown in FIG. 13a employs sheet-like base material 6a to both faces of which processing for giving light diffusion ability, such as emboss-processing or bead-processing, is applied. Thus both faces of light diffusion member 6 are provided with fine uneven configurations 6b.

Light diffusion member 6 shown in FIG. 13b employs sheet-like base material 6a to both faces of which processing for giving light diffusion ability, such as emboss-processing or bead-processing, is applied. Thus both faces of light diffusion member 6 are provided with fine uneven configurations 6b. In addition, light diffusive material 6c is dispersed within base material 6a.

Light diffusion member 6 shown in FIG. 13c employs sheet-like base material 6a to only an inner face of which processing for giving light diffusion ability, such as emboss-processing or bead-processing, is applied to form a fine uneven configuration 6b. It is noted that the inner face of light diffusion member 6 is a face directed to light flux control member 4. In addition, other face of light diffusion member 6 is provided with a great number of repeated prismatic projections 6d extending along a direction perpendicular to the paper surface.

Light diffusion member 6 shown in FIG. 13d is the same as one shown in FIG. 13c except that light diffusive material 6c is dispersed within base material 6a. In the same manner as the case of FIG. 13c, processing such as emboss-processing or bead-processing is applied to one face directed to light flux control member 4 to form a fine uneven configuration 6b. The other face of light diffusion member 6 is provided with a great number of repeated prismatic projections 6d extending along a direction perpendicular to the paper surface. Each of prismatic projections 6d shown in FIGS. 13c and 13d is shaped like triangle, for instance, like isosceles triangle.

Light diffusion member 6 shown in FIG. 13e employs sheet-like base material 6a on an emission side face of which circular-cone-like projections 6e for are formed to cause light transmitted through base material 6a to be diffused.

Light diffusion member 6 shown in FIG. 13f employs sheet-like base material 6a on an emission side face of which pyramid-like (such as triangle-pyramid-like, quadrangle-pyramid-like or hexangle-pyramid-like) projections 6f for are formed to cause light transmitted through base material 6a to be diffused.

Every light diffusion member 6 as above transmits and diffuses light emitted from emission face 4b of light flux control member 4, causing member 3 to be illuminated uniformly.

It is noted that every light diffusion member 6 as above may be mounted on an inner face directed to light flux control member 4 of member 3 to be illuminated, or alternatively, may be interposed between light flux control member 4 and member 3 to be illuminated, with being separated from member 3.

<Modifications of Surface Light Source Device and Illumination Unit>

(First Modification)

Figures 14A, 14B:
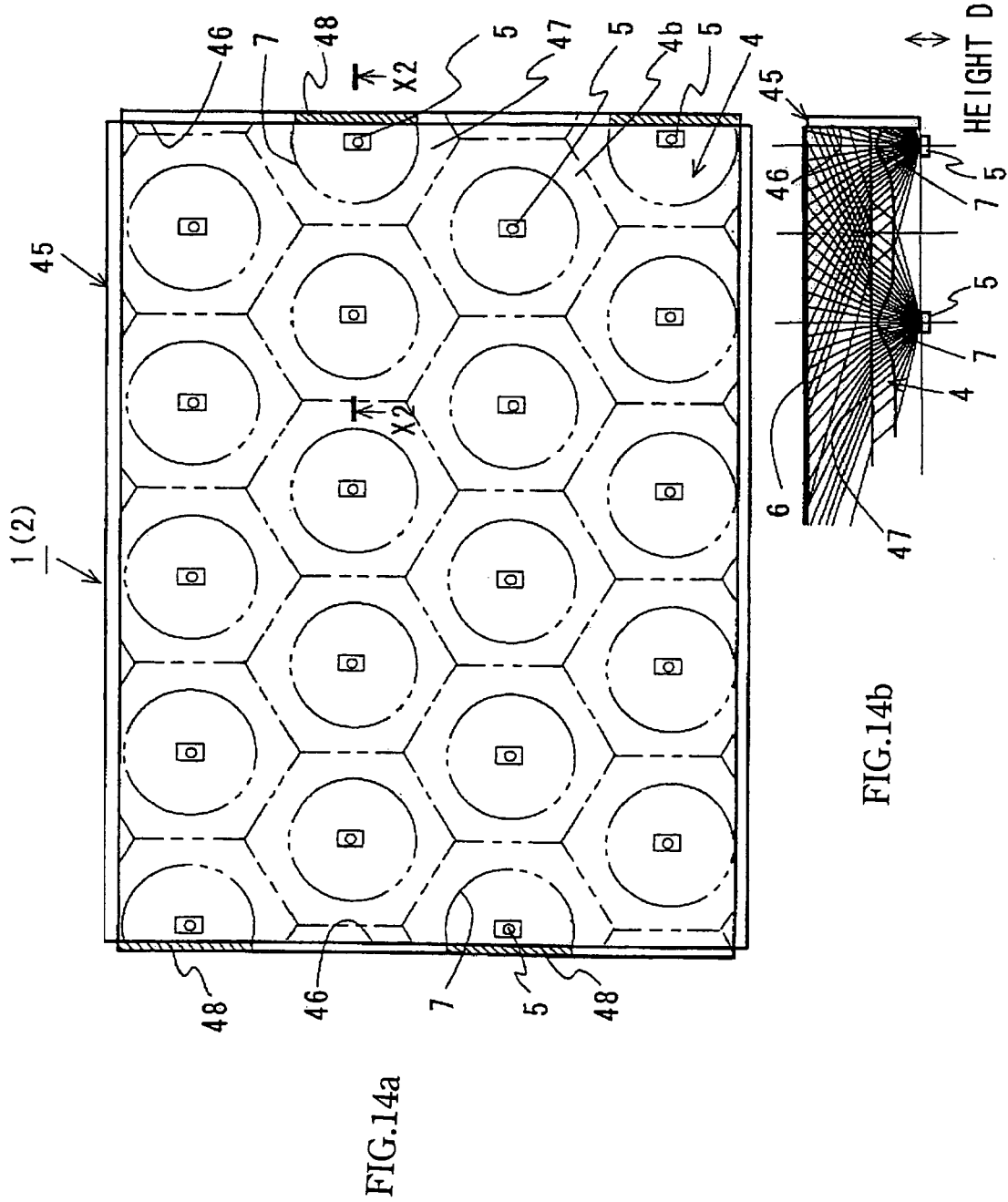

FIGS. 14a and 14b illustrate a first modification of surface light source device 2 and illumination unit 1 to which the present invention is applicable, wherein FIG. 14a is a plan view in which a member to be illuminated and light diffusion member is not shown and FIG. 14b is a cross section view along X2-X2 in FIG. 14a.

Frame 45 is a frame accommodating light flux control member 4.

If LED 5 abuts on side face 46 of frame 45, some light from the same LED 5 is possibly reflected by side face 46 and emitted from emission face 47 near to side face 46.

Such emission could disturb light intensity distribution of emission from emission face 47. Therefore it is preferable to apply light shielding processing to a portion around LED 5 on side face 46 on which that LED 5 could abut. Light shielding processing may be performed by forming light-shielding-processed portion 48 partially on side face 46 in the vicinity of LED 5 that is close to side face 46. Light-shielding-processed portion 48 restrict reflection at side face 46 of frame 45. Black ink well absorbing light may be applied to side face 46 to form light-shielding-processed portion 48.

In FIG. 14a, a range covered by light-shielding-processed portion 48 is a certain region near to LED 5 CLOSE TO side face 46, having a width generally equal to the maximum diameter of recess 7. Light-shielding-processed portion 48 has a covering range along height direction such that the range covers generally full height, as shown in FIG. 14b.

It is noted that light-shielding-processed portion 48 covers, alternatively, only a part of full height.

It is also noted that a specifically lowered voltage may be applied to LED 5 close to side face 46 to reduce emission intensity thereof instead of forming light-shielding-processed portion 48 on side face 46. Such an intensity-reduced emission of LED 5 avoids light reflected by side face 46 to disturb uniformity of emission intensity from emission face 47 of light flux control member 4.

A light-shielding-processed portion may be formed on a side face of light flux control member 4 opposite to side face 46.

A light diffusion member may be provided with a light-shielding-processed portion instead of that formed on frame 45 or light flux control member 4, for example, by printing.

Any combination of the above arts of light-shielding or light-reducing may be employed. A light-shielding may be formed on a bottom of a frame or a reflection sheet.

(Second Modification)

Figures 15A, 15B:
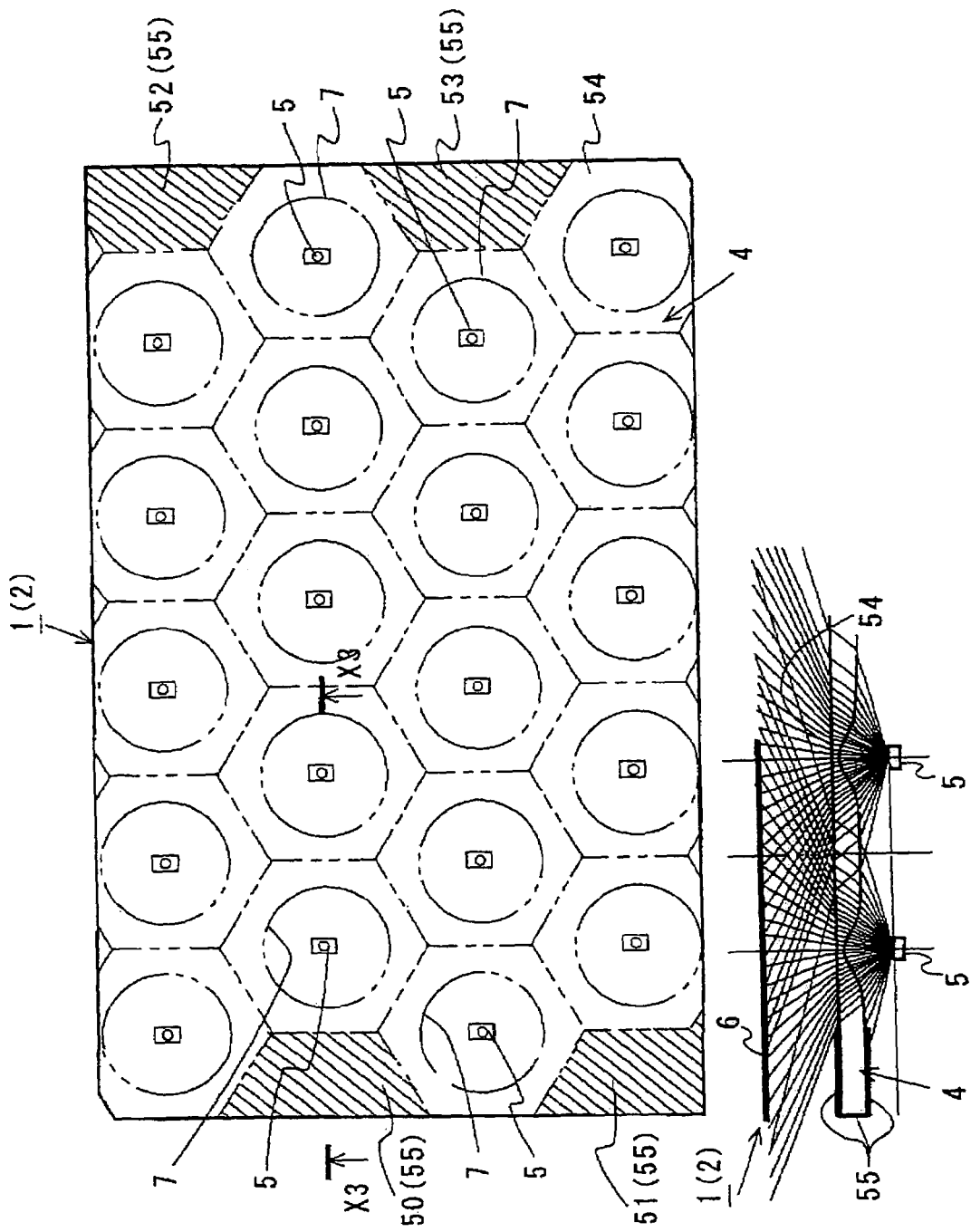

FIGS. 1a and 15b illustrate a second modification of surface light source device 2 and illumination unit 1 to which the present invention is applicable, wherein FIG. 15a is a plan view in which a member to be illuminated and light diffusion member is not shown and FIG. 15b is a cross section view along X3-X3 in FIG. 15a.

As shown in FIGS. 15a and 15b, no LED 5 is disposed in hatched regions 50 to 53. In such situation, emission intensity from emission face 54 of light flux control member 4 tends to be short in the vicinity of regions 50 to 53. This short of light is relaxed by forming an irregular reflection portion 55 which is formed by applying irregular-reflection-processing to hatched regions 50 to 53 on emission face 54. Light reaching irregular reflection portion 55 form a corresponding LED 5 is irregularly reflected, providing a promoted emission. As a result, emission uniformity from emission face 54 is uniformalized. Irregular-reflection-processing may be performed by surface-roughening, applying irregular-reflection-film or irregular-reflection-paint. Irregular reflection portion 55 is formed at least a position on any face of light flux control member 4, preferably being formed on emission face, back face and side face of light flux control member 4.

<Emission Intensity from Light Diffusion Member>

Figure 16:
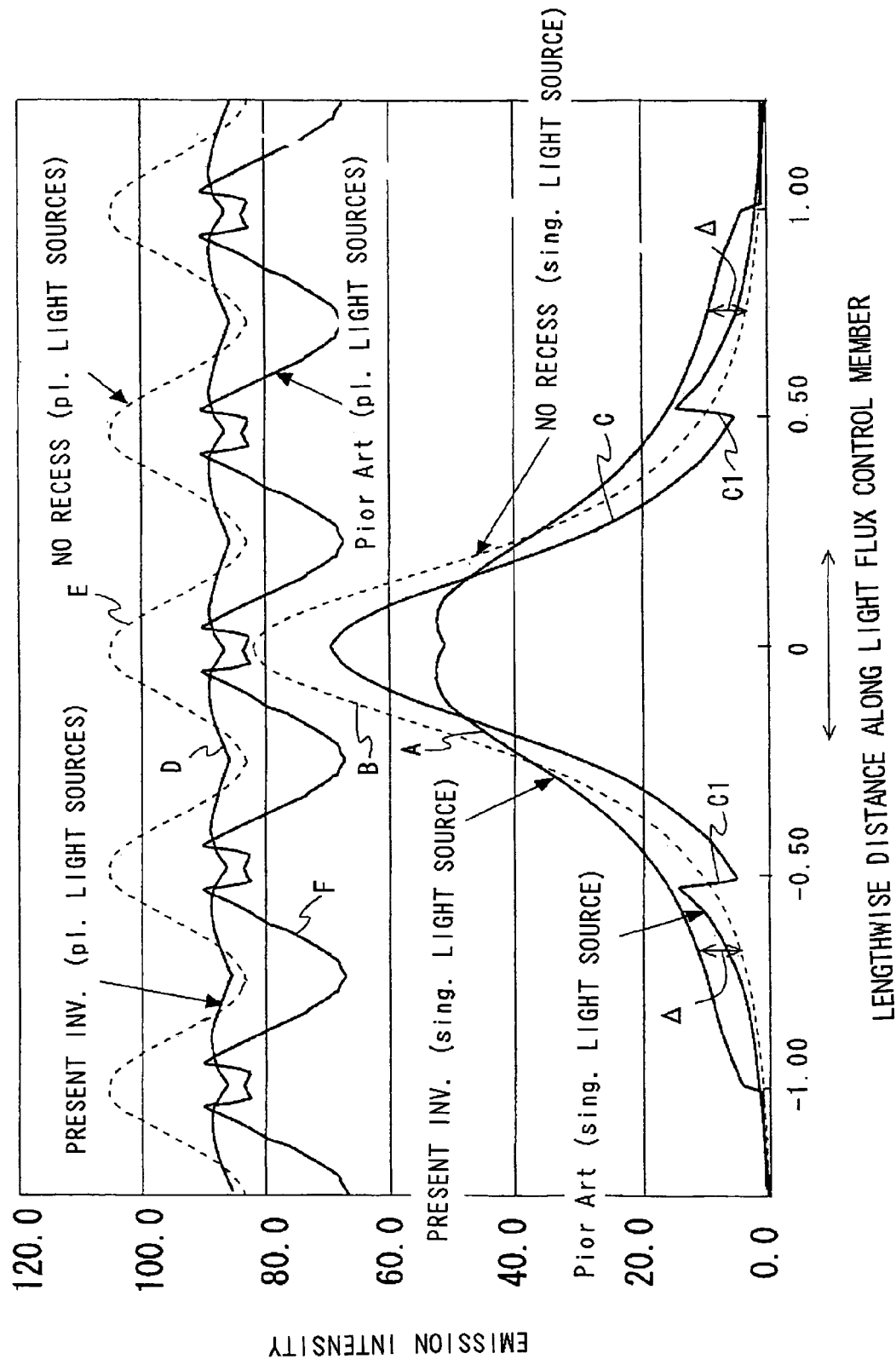
FIG. 16 is a diagram illustrating distributions of emission intensity from a member to be illuminated of illumination unit to which the present invention is applied.

FIG. 16 is a diagram illustrating distributions of emission intensity of light from member 3 to be illuminated of illumination unit 1.

(Case of Single LED Arrangement)

In FIG. 16, curve A shows a distribution of emission intensity in a case where a single LED 5 (point-like light source) is disposed as to be directed to a recess 7 configured in accordance with the present invention on back face 4a of light flux control member 4.

In FIG. 16, curve B shows a distribution of emission intensity in a case where a single LED 5 (point-like light source) is disposed as to be directed to back face 4a of light flux control member 4 having no recess.

Comparing curve A with curve B, curve A tells that an increased intensity is realized at positions far from optical axis L as compared with that shown by curve B. Such an increased intensity can be estimated by difference A between A and B.

Referring to FIG. 17a, illustrated is an illumination unit 1 employing a light flux control member 4 provided with a recess configured in accordance with the present invention while FIG. 17b illustrates an illumination unit 1 employing a light flux control member 4 provided with a recess 60 configured in accordance with a prior art.

A distribution of emission intensity of illumination unit 1 shown in FIG. 17b is depicted by curve C in FIG. 16. Curve C tells that a sharp rising of emission intensity occurs at a region C1.

It can be said that such a sharp intensity rising is caused by emission light beams which are mutually intersected as shown by Y1 in FIG. 17b.

It should be noted that employment of prior art recess 60 gives a relation between $\theta1$ and $\theta3$, which is previously mentioned in connection with FIG. 5, such that $\theta3$ increases in proportion to increasing of $\theta1$.

A relation $(\theta5/\theta1)>1$ is satisfied not only by employment of recess 7 in accordance with the present invention but also by employment of prior art recess 60 as shown in FIG. 4. However, $(\theta5/\theta1)$ increases according to increasing of $\theta1$ in the case of prior art recess 60. In other words, foresaid Condition 2 is not satisfied. After all, prior art recess 7 having a conventional configuration involves a sharp changing of inclination to be coupled with a flat portion of back face 4a, failing to have a smooth coupling free from sharp changing of inclination.

As a result, it is difficult to output a uniformly expanded emission fluxes form emission face 4b of light flux control member 4 as illustrated in FIG. 17b. In addition, some light travelled within light flux control member 4 is inner-reflected by emission face 4b without being outputted, reducing emission efficiency.

Such drawbacks of prior art illumination unit 1 shown in FIG. 17b are deleted by illumination unit 1 shown in FIG. 17a employing light flux control member 4 provided with recess 7 configured in accordance with the present invention.

That is, in the case of illumination unit 1 shown in FIG. 17a, for light which is emitted toward within a half-intensity-angular-range from LED 5, relation $\theta5/\theta1>1$ is satisfied except for light emitted toward within an angular-neighborhood of a normal direction with respect to emission face 4b, as shown in FIG. 4, and value of $\theta5/\theta1$ falls gradually according to increasing of $\theta1$.

This causes light fluxes after being outputted from light flux control member 4 are light fluxes uniformly, effectively and smoothly expanded light fluxes as illustrated by curve A in FIG. 16.

(Case of Multi-LED Arrangement)

In FIG. 16, curve D shows a distribution of emission intensity of light emitted from light diffusion member 6 in a case where a plurality of LEDs 5 (point-like light sources) are disposed at a certain interval as to be directed to corresponding recesses 7, respectively, configured in accordance with the present invention on back face 4a of light flux control member 4 of illumination unit 1 which is constructed, for example, as shown un FIGS. 1 and 2.

On the other hand, curve E shows a distribution of emission intensity in a case the same as the above illumination unit providing curve D except that no recess id formed on back face 4a of light flux control member 4.

Comparing curve D with curve E, curve D shows a small variation of intensity and hardly involves a sharp changing as compared with that shown by curve E.

This tells that illumination unit 1 in accordance with the present invention outputs much uniformalized light fluxes from light diffusion member 6 as compared with conventional illumination unit 1 providing curve E.

Next, curve F shows a distribution of emission intensity from light diffusion member 6 in a case where illumination unit 1 employing light flux control member 4 having a plurality of recesses 60 as shown in FIG. 17b and LEDs 5 correspondingly.

Curve F has a plurality of parts at which sharp and large intensity changes occur corresponding to LEDs 5 or recesses 60. To the contrary, curve D is almost free from sharp intensity changes and shows only small changes.

Thus employment of recesses 7 enables light fluxes after being outputted from light flux control member 4 to be uniformly and effectively expanded. Light fluxes from LEDs adjacent to each other are well mixed, providing a uniform intensity emission as illustrated by curve D.

In addition, if there are emission color differences, such as differences in degree of being yellowish, between LEDs 5, light fluxes from LEDs 5 well mixed as above prevent the differences from looking conspicuous, providing a high quality illumination.

<Surface Light Source Device and Illumination Unit for Color Illumination>

Figure 18:
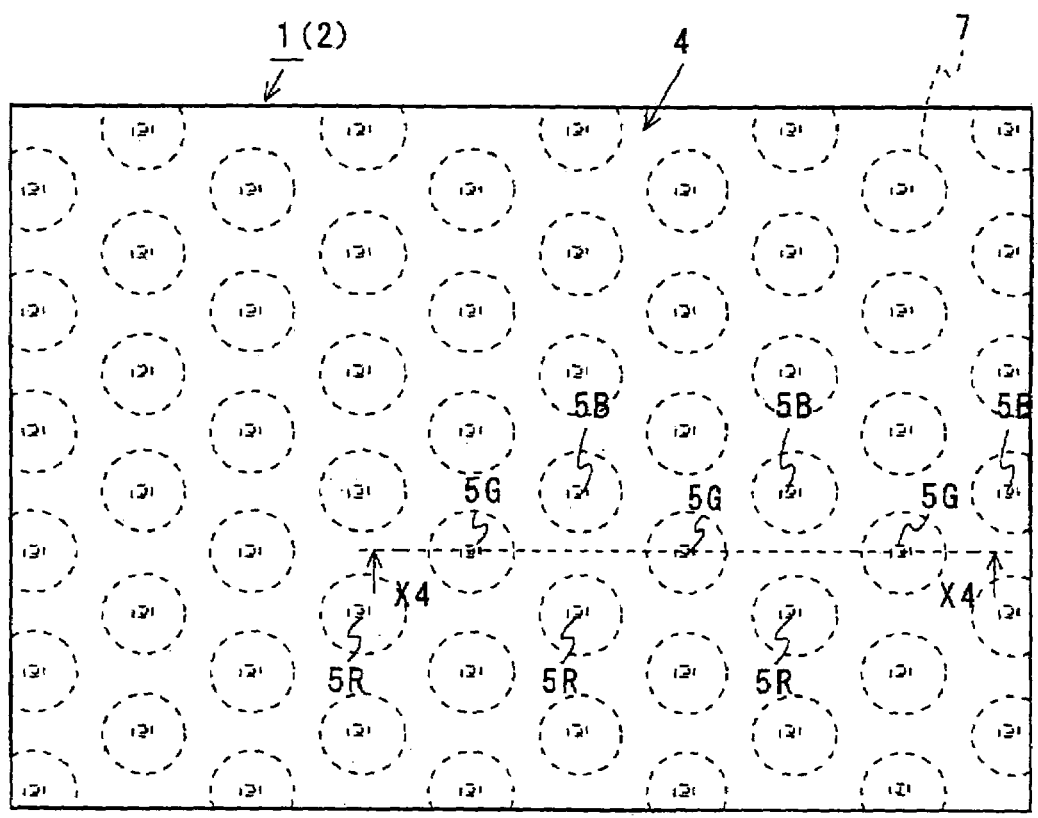
FIG. 18 is a plan view illustrating a color-emission type surface light source device and illumination unit using the same to which the present invention is applicable, with a member to be illuminated and light diffusion member being not shown.
Figure 19:
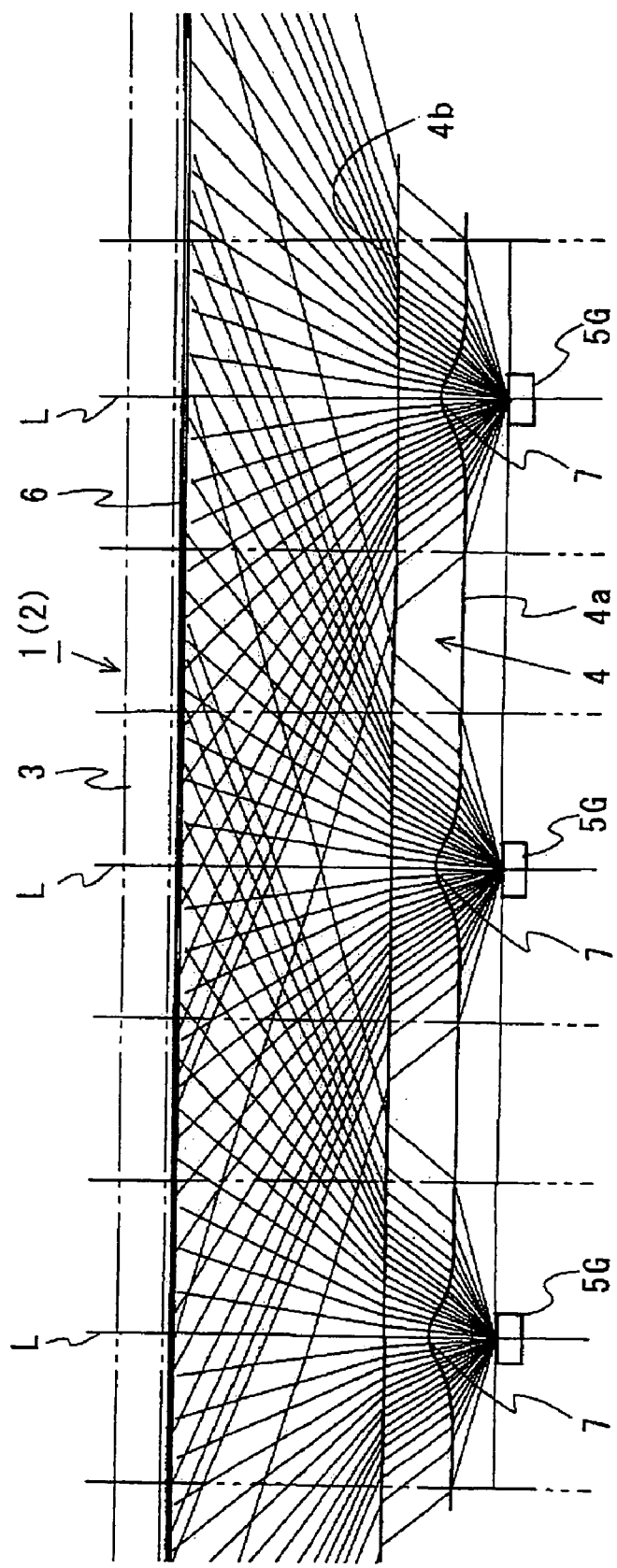
FIG. 19 is a cross section view of the illumination unit shown in FIG. 18 along X4-X4.

FIGS. 18 and 19 illustrate color-emission type surface light source device 2 and illumination unit 1 using the same to which the present invention is applicable.

FIG. 18 is a plan view illustrating color-emission type surface light source device 2 and illumination unit 1, with a member 3 to be illuminated and light diffusion member 6 being not shown. FIG. 19 is a cross section view of illumination unit 1 shown in FIG. 18 along X4-X4.

Color-emission type surface light source device 2 is composed of light flux control member 4 and LEDs 5R, 5g and 5B. LEDs 5R, 5g and 5B are disposed alternately and emit red, green and blue light, respectively. Color light fluxes from LEDs 5R, 5G and 5B are introduced into light flux control member 4 through corresponding recesses 7, respectively.

As shown in FIG. 19, fluxes near to an end of left side LED 5G reach the vicinity of an intersection of optical axis L of right side LED 5G and light diffusion member 6 across a range corresponding middle LED 5G.

In a such way, fluxes from LEDs 5 are well mixed not only when all colors of LEDs are switched on but also when a single color of LEDs are switched on, with the result a uniform and excellent illumination is realized.

Figure 20:
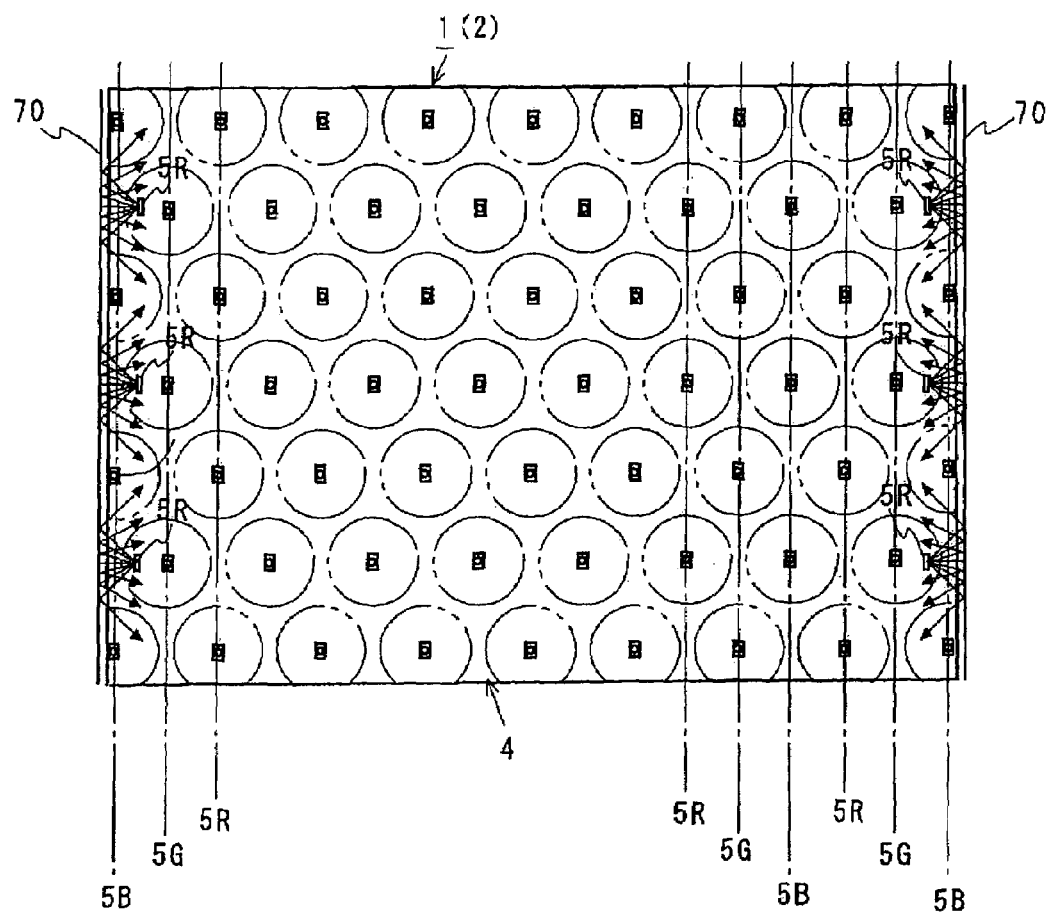
FIG. 20 is a plan view of a modification of a color-emission type surface light source device and illumination unit using the same to which the present invention is applicable, wherein a member to be illuminated and light diffusion member are not shown.

FIG. 20 is a modification of a color-emission type surface light source device 2 and illumination unit 1 using the same.

In this modification, additional LEDs 5R, 5G and 5B (all of them or a part of them) to cover short of emission intensity. Such short of emission intensity of any color light from LED 5R, 5G or 5B tends to appear at regions near to left and right sides of light flux control member 4 shown in FIG. 20. Additional LEDs may be mounted so that optical axes of them are inclined toward frame 70. If so mounted, light from the additional LEDs is reflected by corresponding inner surfaces of frame 70, being diffused widely. This causes light from the additional LEDs to be widespread. The additional LEDs may be supplied with electric current or voltage different from that with which the other LEDs are supplied in order to control emission intensity of additional LEDs.

In this modification shown in FIG. 20, LEDs 5R, 5G or 5B are additionally arranged left and right sides of light flux control member 4. It is noted that further addition of LEDs may be adopted for cover other brightness-short regions.

For example, if brightness-short regions exist at upper and lower sides of light flux control member 4, additional LEDs 5R, 5G or 5B may be arranged there.

LED additional arrangement to light-short regions may be applied to cases where single color emission employed, in order to reduce unevenness of emission color.

<Other Modifications of Light Flux Control Member>

Figure 21A:
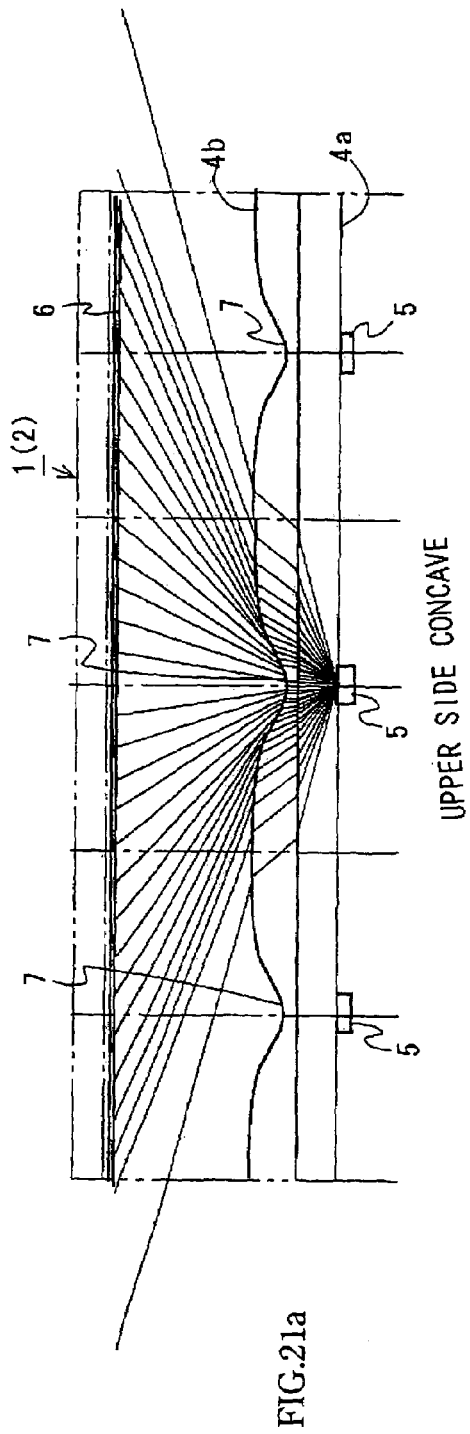
Figure 21B:
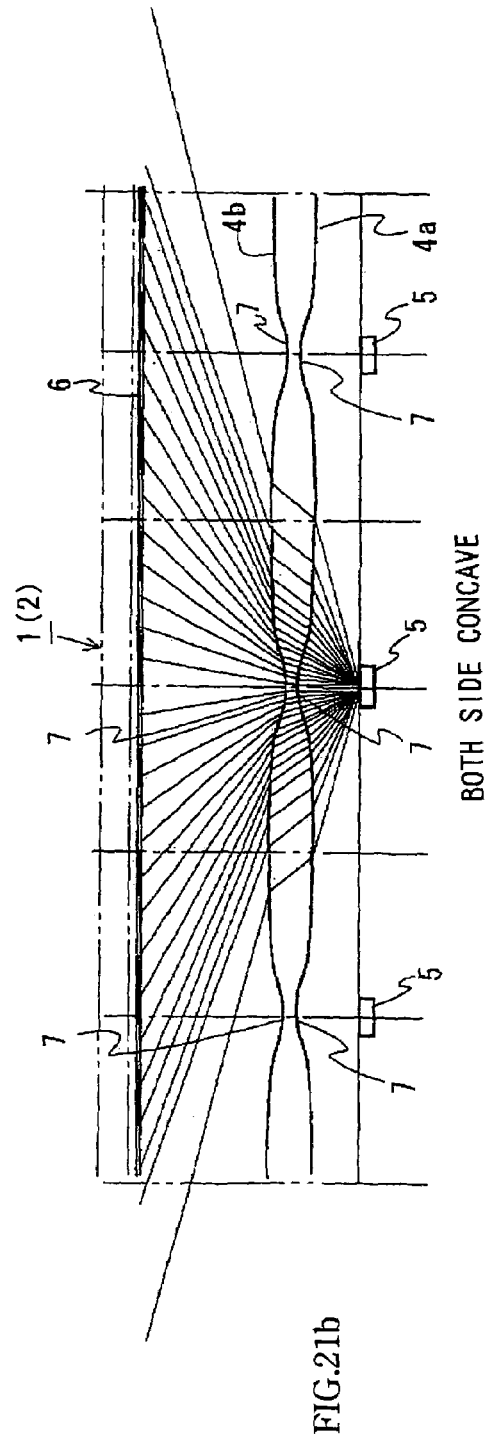
Figure 22:
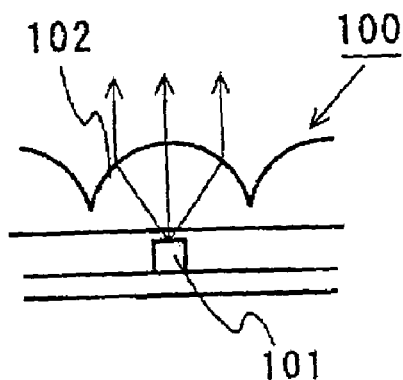
FIG. 22 is a diagram illustrating a structure of a first prior art.
Figure 23:
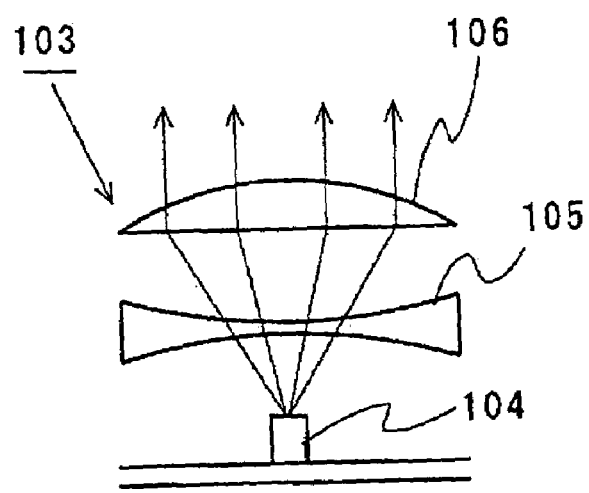
FIG. 23 is a diagram illustrating a structure of a second prior art.
Figure 24:
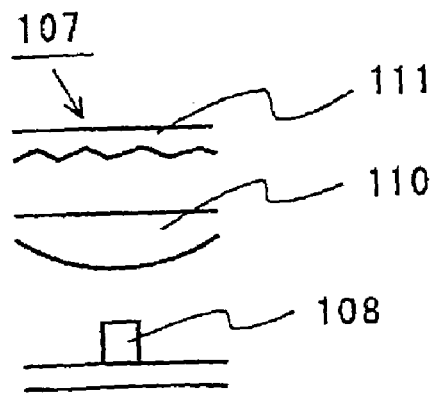
FIG. 24 is a diagram illustrating a structure of a third prior art.

Recess or recesses 7 may be may be formed on emission face 4b as shown in FIG. 21a. Alternatively, recess or recesses 7 may be may be formed on both faces 4a and 4b as shown in FIG. 21b.

In the above embodiments, optical axis L of each LED 5 has the same direction as a normal direction with respect to light flux control member 4 (or emission face 4b). However, this does not limit the scope of the present invention. That is, optical axis L of LED 5 incorporated in a surface light source device or illumination unit can have some small deviation from the normal direction because of various factors such as unevenness of optical characteristics, quality, or assembling errors. The present invention can be applied to such cases without losing effects similar to those in the above embodiments obtained.

What is claimed is:

1. A surface light source device comprising a point-like light source and a light flux control member which receives light from said point-like light source and has an emission face from which said light is emitted, wherein said light flux control member has a back face opposite to said emission face which is provided with a recess corresponding to said point-like light source, said recess having a concave section meeting a convex section and being configured so as to satisfy the following Conditions 1 and 2 for at least light which is emitted toward the recess within a half-intensity-angular-range from said point-like light source;

{Condition 1: Relation $\theta_5/\theta_1>1$ is satisfied except for light emitted toward the recess within an angular-neighborhood of a normal direction with respect to said emission face;

Condition 2; Value of $\theta_5/\theta_1$ falls gradually according to increasing of $\theta_1$;

(where $\theta_1$ is an emission angle of any light at being emitted from said point-like light source and $\theta_5$ is an emission angle of that light at being then emitted from said emission face)}.

2. A surface light source device in accordance with claim 1, wherein said recess has a first light-input face and a second light-input face which are connected at a connection location to provide a point of inflection.

3. An illumination unit comprising a surface light source device, a light diffusion member and an illuminated member supplied with light from said surface light source device through said diffusion member, wherein said surface light source device is one in accordance with claim 1 or 2.

4. A surface light source device comprising a plurality of point-like light sources and a light flux control member which receives light from said point-like light sources and has an emission face from which said light is emitted, wherein said light flux control member has a back face opposite to said emission face which is provided with recesses corresponding to said point-like light sources respectively, each of said recesses having a concave section meeting a convex section and being configured so as to satisfy the following Conditions 1 and 2 for at least light which is emitted toward the respective recesses within a half-intensity-angular-range from a corresponding point-like light source of said point-like light sources;

{Condition 1: Relation $\theta 5/\theta 1>1$ is satisfied except for light emitted toward the recess within an angular-neighborhood of a normal direction with respect to said emission face;

Condition 2; Value of $\theta 5/\theta 1$ falls gradually according to increasing of $\theta 1$;

(where $\theta 1$ is an emission angle of any light at being emitted from said corresponding point-like light source and $\theta 5$ is an emission angle of that light at being then emitted from said emission face)}.

5. A surface light source device in accordance with claim 4, wherein each of said recesses has a first light-input face and a second light-input face which are connected at a connection location to provide a point of inflection.

6. An illumination unit comprising a surface light source device, a light diffusion member and an illuminated member supplied with light from said surface light source device through said diffusion member, wherein said surface light source device is one in accordance with claim 4 or 5.

7. A light flux control member receiving light from a point-like light source and having an emission face from which said light is emitted, wherein said light flux control member has a back face opposite to said emission face which is provided with a recess corresponding to said point-like light source, said recess having a concave section meeting a convex section and being configured so as to satisfy the following Conditions 1 and 2 for at least light which is emitted toward the recess within a half-intensity-angular-range from said point-like light source;

{Condition 1: Relation $\theta 5/\theta 1>1$ is satisfied except for light emitted toward the recess within an angular-neighborhood of a normal direction with respect to said emission face;

Condition 2; Value of $\theta 5/\theta 1$ falls gradually according to increasing of $\theta 1$;

(where $\theta 1$ is an emission angle of any light at being emitted from said point-like light source and $\theta 5$ is an emission angle of that light at being then emitted from said emission face)}.

8. A light flux control member in accordance with claim 7, wherein said recess has a first light-input face and a second light-input face which are connected at a connection location to provide a point of inflection.

9. A light flux control member receiving light from a plurality of point-like light sources and having an emission face from which said light is emitted, wherein said light flux control member has a back face opposite to said emission face which is provided with recesses corresponding to said point-like light sources respectively, each of said recesses having a concave section meeting a convex section and being configured so as to satisfy the following Conditions 1 and 2 for at least light which is emitted toward the respective recesses within a half-intensity-angular-range from a corresponding point-like light source of said point-like light sources;

{Condition 1: Relation $\theta 5/\theta 1>1$ is satisfied except for light emitted toward the recesses within an angular-neighborhood of a normal direction with respect to said emission face;

Condition 2; Value of $\theta 5/\theta 1$ falls gradually according to increasing of $\theta 1$;

(where $\theta 1$ is an emission angle of any light at being emitted from said corresponding point-like light source and $\theta 5$ is an emission angle of that light at being then emitted from said emission face)}.

10. A light flux control member in accordance with claim 9, wherein each of said recesses has a first light-input face and a second light-input face which are connected at a connection location to provide a point of inflection.

* * * * *